US012716710B2

(12) United States Patent
Wheeler et al.

(10) Patent No.: US 12,716,710 B2
(45) Date of Patent: Aug. 25, 2026

(54) SYSTEMS AND METHODS OF MEASURING SAMPLE THICKNESS

(71) Applicant: 10x Genomics, Inc., Pleasanton, CA (US)

(72) Inventors: Tobias Daniel Wheeler, Pleasanton, CA (US); Augusto Manuel Tentori, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 130 days.

(21) Appl. No.: 18/390,503

(22) Filed: Dec. 20, 2023

(65) Prior Publication Data

US 2024/0210161 A1 Jun. 27, 2024

Related U.S. Application Data

(60) Provisional application No. 63/434,784, filed on Dec. 22, 2022.

(51) Int. Cl.
*G01B 11/06* (2006.01)

(52) U.S. Cl.
CPC ................................ *G01B 11/0608* (2013.01)

(58) Field of Classification Search
CPC . G01B 11/272; G01B 11/0608; G03F 9/7046; G03F 9/7065; G03F 9/7069; G03F 9/7076; G03F 9/7092
USPC .......... 356/399–401, 616, 601, 243.1, 243.4, 356/237.2–237.6; 256/356, 616, 601, 256/243.1, 243.4, 237.2–237.6
See application file for complete search history.

(56) References Cited

U.S. PATENT DOCUMENTS 6,055,049 A * 4/2000 Mueller ............. H05K 13/0818 356/243.1
2003/0223630 A1* 12/2003 Adel ..................... G03F 9/7011 382/145
2004/0212801 A1* 10/2004 Wu ....................... G03F 9/7011 356/400
2008/0049203 A1* 2/2008 Mishima ............... G03F 9/7076 430/5
2008/0067447 A1* 3/2008 Nakayama .......... H01J 37/3045 250/492.22
2009/0051935 A1* 2/2009 Cooper ................ B23K 26/042 356/616
2009/0135389 A1* 5/2009 Hofmans ............ G03F 7/70683 355/55
2011/0001978 A1* 1/2011 Smilde .................... G03F 7/705 356/446
2016/0377412 A1* 12/2016 Li ...................... G01N 21/9501 356/630

(Continued)

OTHER PUBLICATIONS

Hall, et al., "Mapping Three-Dimensional Stress and Strain Fields within a Soft Hydrogel Using a Fluorescence Microscope," Biophysical Journal, vol. 102, pp. 2241-2250 (May 2012).

*Primary Examiner* — Isiaka O Akanbi
(74) *Attorney, Agent, or Firm* — Foley & Lardner LLP

(57) ABSTRACT

A method includes receiving an image of a plurality of fiducial markers, where the plurality of fiducial markers has at least one predetermined height relative to a substrate. The method also includes determining at least one optical metric associated with the plurality of fiducial markers within the image, and determining a calibration model based on the at least one predetermined height and the at least one optical metric.

20 Claims, 7 Drawing Sheets

(56) References Cited

U.S. PATENT DOCUMENTS

| | | | | |
|---|---|---|---|---|
| 2019/0163072 | A1* | 5/2019 | Schoormans | G03F 9/7019 |
| 2024/0044754 | A1 | 2/2024 | Morgan et al. | |

* cited by examiner

350 height step #

355 optical metric step height

SYSTEMS AND METHODS OF MEASURING SAMPLE THICKNESS

CROSS-REFERENCE TO RELATED APPLICATIONS

This application claims priority to U.S. Provisional Patent Application No. 63/434,784 filed Dec. 22, 2022, the entirety of which is herein incorporated by reference.

BACKGROUND

The present disclosure relates generally to the field of tissue thickness measurement and, more specifically, tissue thickness measurement using optical methods.

Various applications require tissue thickness measurements in both dried and hydrated states, including throughout an experimental procedure. Existing methods for tissue thickness measurement of dried tissues are often not compatible with hydrated tissues in solution due to, for example, a change in dimensions of the tissue.

SUMMARY

One aspect of the present disclosure relates to a method, where the method includes receiving an image of a plurality of fiducial markers, and where the plurality of fiducial markers has at least one predetermined height relative to a substrate. The method further includes determining at least one optical metric associated with the plurality of fiducial markers within the image and determining a calibration model based on the at least one predetermined height and the at least one optical metric.

In various implementations, the plurality of fiducial markers is positioned on at least one surface of a calibration material, where the calibration material is disposed on the substrate. In some implementations, the calibration material is fabricated on the substrate using at least one of photopatterning, micromilling, etching, injection molding, hot embossing, or 3D printing. In other implementations, the substrate includes one or more height references, where each height reference is associated with a unique surface of the at least one surface. In yet other implementations, the at least one surface includes a plurality of surfaces. In various implementations, the plurality of surfaces includes a plurality of steps. In some implementations, the plurality of fiducial markers have a substantially uniform size and shape. In other implementations, the plurality of fiducial markers include fluorescent elements. In yet other implementations, the at least one optical metric includes a diameter. In various implementations, the diameter is a defocused diameter of at least one of the plurality of fiducial markers. In some implementations, a same focal plane is used to determine the at least one optical metric associated with the plurality of fiducial markers. In other implementations, the at least one optical metric includes an intensity. In yet other implementations, the at least one optical metric includes a focal plane. In various implementations, the at least one optical metric includes a shape. In some implementations, the at least one predetermined height is less than or equal to about 50 microns. In other implementations, the at least one predetermined height is less than or equal to about 1 micron. In yet other implementations, the at least one predetermined height is less than or equal to about 0.25 micron. In various implementations, the calibration model is a calibration curve. In some implementations, the method also includes storing the calibration model in a database. In other implementations, the database is at a remote server.

Another aspect of the present disclosure relates to a computer program product, which includes a computer readable storage medium having program instructions stored thereon, where the program instructions executable by a processor to cause the processor to perform a method. The method includes receiving an image of a plurality of fiducial markers, where the plurality of fiducial markers has at least one predetermined height relative to a substrate. The method also includes determining at least one optical metric associated with the plurality of fiducial markers within the image, and determining a calibration model based on the at least one predetermined height and the at least one optical metric.

In various embodiments, the plurality of fiducial markers is positioned on at least one surface of a calibration material, where the calibration material is disposed on the substrate. In some embodiments, the calibration material is fabricated on the substrate using at least one of photopatterning, micromilling, etching, injection molding, hot embossing, or 3D printing. In other embodiments, the substrate includes one or more height references, where each height reference is associated with a unique surface of the at least one surface. In yet other embodiments, the at least one surface includes a plurality of surfaces. In various embodiments, the plurality of surfaces includes a plurality of steps. In some embodiments, the plurality of fiducial markers have a substantially uniform size and shape. In other embodiments, the plurality of fiducial markers include fluorescent elements. In yet other embodiments, the at least one optical metric includes a diameter. In various embodiments, the diameter is a defocused diameter of at least one of the plurality of fiducial markers. In some embodiments, a same focal plane is used to determine the at least one optical metric associated with the plurality of fiducial markers. In other embodiments, the at least one optical metric includes an intensity. In yet other embodiments, the at least one optical metric includes a focal plane. In various embodiments, the at least one optical metric includes a shape. In some embodiments, the at least one predetermined height is less than or equal to about 50 microns. In other embodiments, the at least one predetermined height is less than or equal to about 1 micron. In yet other embodiments, the at least one predetermined height is less than or equal to about 0.25 micron. In various embodiments, the calibration model is a calibration curve. In some embodiments, the method further includes storing the calibration model in a database. In other embodiments, the database is at a remote server.

Another aspect of the present disclosure relates to a system, which includes a computing node including a computer readable storage medium having program instructions stored thereon, where the program instructions are executable by a processor of the computing node to cause the processor to perform a method. The method includes receiving an image of a plurality of fiducial markers, where the plurality of fiducial markers has at least one predetermined height relative to a substrate. The method further includes determining at least one optical metric associated with the plurality of fiducial markers within the image, and determining a calibration model based on the at least one predetermined height and the at least one optical metric.

In various embodiments, the plurality of fiducial markers is positioned on at least one surface of a calibration material, wherein the calibration material is disposed on the substrate. In some embodiments, the calibration material is fabricated on the substrate using at least one of photopatterning, micromilling, etching, injection molding, hot embossing, or 3D printing. In other embodiments, the substrate includes one or more height references, where each height reference is associated with a unique surface of the at least one surface. In yet other embodiments, the at least one surface includes a plurality of surfaces. In various embodiments, the plurality of surfaces includes a plurality of steps. In some embodiments, the plurality of fiducial markers have a substantially uniform size and shape. In other embodiments, the plurality of fiducial markers include fluorescent elements. In yet other embodiments, the at least one optical metric includes a diameter. In various embodiments, the diameter is a defocused diameter of at least one of the plurality of fiducial markers. In some embodiments, a same focal plane is used to determine the at least one optical metric associated with the plurality of fiducial markers. In other embodiments, the at least one optical metric includes an intensity. In yet other embodiments, the at least one optical metric includes a focal plane. In various embodiments, the at least one optical metric includes a shape. In some embodiments, the at least one predetermined height is less than or equal to about 50 microns. In other embodiments, the at least one predetermined height is less than or equal to about 1 micron. In yet other embodiments, the at least one predetermined height is less than or equal to about 0.25 micron. In various embodiments, the calibration model is a calibration curve. In some embodiments, the system further includes a camera, where the image is acquired by the camera. In other embodiments, the system further includes a database, where the method further includes storing the calibration model in the database. In yet other embodiments, the database is at a remote server.

Another aspect of the present disclosure relates to a method, where the method includes accessing a calibration model from a database, receiving an image of a plurality of fiducial markers disposed on a biological sample, where the biological sample is positioned on a substrate, and determining, based on the calibration model and the image, one or more measured heights of the biological sample.

In various implementations, the method also includes calibrating a motion control system based on the one or more measured heights. In some implementations, the method further includes determining an imageable volume for the biological sample based on the one or more measured heights. In other implementations, the method also includes determining a plurality of z-stacks of the imageable volume.

Another aspect of the present disclosure relates to a computer program product including a computer readable storage medium having program instructions stored thereon, where the program instructions are executable by at least one processor to cause the processor to perform a method. The method includes accessing a calibration model from a database, receiving an image of a plurality of fiducial markers disposed on a biological sample, where the biological sample is positioned on a substrate, and determining, based on the calibration model and the image, one or more measured heights of the biological sample.

In various embodiments, the method also includes calibrating a motion control system based on the one or more measured heights. In some embodiments, the method further includes determining an imageable volume for the biological sample based on the one or more measured heights. In other embodiments, the method also includes determining a plurality of z-stacks of the imageable volume.

Another aspect of the present disclosure relates to a system. The system includes a computing system including at least one computer readable storage medium having program instructions stored thereon, where the program instructions are executable by at least one processor of the computing system to cause the at least one processor to perform a method. The method includes accessing a calibration model from a database, receiving an image of a plurality of fiducial markers disposed on a biological sample, where the biological sample is positioned on a substrate, and determining, based on the calibration model and the image, one or more measured heights of the biological sample.

In various embodiments, the system also includes a camera, where the image is obtained by the camera. In some embodiments, method further includes calibrating a motion control system based on the one or more measured heights. In other embodiments, the method further includes determining an imageable volume for the biological sample based on the one or more measured heights. In yet other embodiments, the method further includes determining a plurality of z-stacks of the imageable volume. In various embodiments, the database is a local database. In some embodiments, the database is a remote database.

Another aspect of the present disclosure relates to a method. The method includes providing a calibration slide, where the calibration slide includes a substrate having a calibration material disposed thereon, and where the calibration material includes at least one surface having a plurality of predetermined heights relative to the substrate. The method further includes positioning a first plurality of fluorescent markers on the at least one surface, acquiring a first image of the plurality of fluorescent markers, determining, from the first image, at least one optical metric associated with the plurality of fluorescent markers within the first image, and determining a calibration model based on the at least one predetermined height and the at least one optical metric.

In various implementations, the method also includes providing a sample slide including a biological sample, positioning a second plurality of fluorescent markers on one or more surfaces of the biological sample, acquiring a second image of the second plurality of fluorescent markers, and determining, based on the calibration model and the second image, a plurality of measured heights of the biological sample. In some implementations, further including determining an imageable volume for the biological sample based on the one or more measured heights. In other implementations, the method also includes determining a plurality of z-stacks of the imageable volume.

Another aspect of the present disclosure relates to a calibration slide including a substrate, and a calibration material having a plurality of steps having a plurality of predetermined heights relative to the substrate, where adjacent steps have a step height of about 0.1 micron to about 5 microns.

In various embodiments, the width of each step is at least 1 mm. In some embodiments, the width of each step is between 1 mm and 50 mm. In other embodiments, the calibration material is fabricated on the substrate using at least one of photopatterning, micromilling, etching, injection molding, hot embossing, or 3D printing. In yet other embodiments, the substrate includes one or more height references, where each height reference is associated with a unique step of the plurality of steps. Various embodiments also relate to a kit including the calibration slide and a plurality of fiducial markers.

Another aspect of the present disclosure relates to a method. The method includes acquiring, using an image sensor, an image corresponding to a slide preparation having a slide, a material sample disposed on the slide, and a marker disposed on a surface of the material sample. The method further includes determining a metric of the marker within the image, and determining, according to the metric, a physical dimension of the material sample at the marker along a defined axis by applying a calibration model to the metric, the calibration model correlating metrics of imaged markers to physical dimensions along the defined axis.

In various implementations, the metric varies according to which focal plane the marker is located in. In some implementations, the marker includes a plurality of fluorescent elements. In other implementations, the physical dimension is a height or thickness of the material sample on the slide preparation. In yet other implementations, the material sample is a tissue sample, where the height or thickness of the tissue sample is no greater than about 50 microns. In various implementations, the calibration model is based on a calibration slide with regions of varying step height along an axis of the slide. In some implementations, the method also includes generating the calibration model using the calibration slide with a plurality of reference markers disposed thereon. In other implementations, generating the calibration model includes generating a calibration curve of the metric as a function of the physical dimension. In yet other implementations, the method further includes manufacturing the calibration slide using at least one of photopatterning, micromilling, etching, injection molding, hot embossing, or 3D printing. In various implementations, the marker is a first marker, the metric is a first metric, the slide preparation further includes a second marker disposed on the slide, and the physical dimension of the material sample is determined based on a difference between the first metric and the second metric. In some implementations, the slide preparation includes a plurality of markers on the slide, where a plurality of metrics is determined based on the plurality of markers, and the method further includes determining that the slide is level based on the plurality of metrics. In various implementations, the plurality of markers includes a first pair of markers on a first side of the material sample and a second pair of markers on a second side of the material sample.

Another aspect of the present disclosure relates to a method. The method includes acquiring, using a light sensor, light from a slide preparation comprising a slide, a material sample disposed on the slide, and a marker disposed on a surface of the material sample. The method also includes determining an intensity of light from the marker, and determining, according to the intensity, a physical dimension of the material sample at the marker along a defined axis by applying a calibration model to the intensity, the calibration model correlating light intensity of markers to physical dimensions along the defined axis.

In various implementations, the marker includes a plurality of fluorescent beads, the material sample is a tissue sample that is no greater than about 50 microns, and the physical dimension is a height of the tissue sample. In some implementations, the calibration model is based on a calibration slide, where the method further includes using the calibration slide to generate a calibration curve of the metric as a function of the physical dimension. In other implementations, the calibration slide includes regions of varying step height along an axis of the slide.

Another aspect of the present disclosure relates to a system. The system a sensor configured to capture an image of a slide preparation or detect light from the slide preparation, where the slide preparation includes a slide, a material sample disposed on the slide, and a marker disposed on a surface of the material sample. The system further includes at least one processor configured to: acquire, using the sensor, (i) an image of the marker, or (ii) light from the marker. The at least one processor is further configured to determine, according to the acquired image or the intensity of light, a metric of the marker, and determine, according to the metric, a physical dimension of the material sample at the marker along a defined axis by applying a calibration model to the metric, the calibration model correlating metrics of markers to physical dimensions along the defined axis.

In various embodiments, the metric is based on a size or a shape of the marker. In some embodiments, the metric is based on intensity of fluorescent light from the marker. In other embodiments, the system further includes a light source configured to excite fluorescent elements. In yet other embodiments, the at least one processor is further configured to generate a calibration curve of the metric as a function of the physical dimension based on a calibration slide with regions of varying height.

Another aspect of the present disclosure relates to a method. The method includes using a calibration slide with reference markers disposed thereon to generate a calibration curve based on optical measurements of the calibration slide, where the calibration slide includes regions of varying height in the z-axis, and where the calibration curve correlates an optical metric to a z-axis position of the reference markers disposed on the regions of the calibration slide. The method further includes acquiring, using a sensor, at least one of (i) fluorescent light from a plurality of fluorescent elements disposed on a sectional tissue sample which is disposed on a substantially flat slide, or (ii) an image of the sectional tissue sample with the plurality of fluorescent elements disposed thereon. The method also includes generating, according to the at least one of the fluorescent light or the image, the optical metric corresponding to the fluorescent elements disposed on the sectional tissue sample. The method also includes applying the calibration model to the optical metric to determine a height of the sectional tissue sample.

BRIEF DESCRIPTION OF THE DRAWINGS

The disclosure will become more fully understood from the following detailed description, taken in conjunction with the accompanying figures, wherein like reference numerals refer to like elements, in which:

FIG. 3 is a top view of a substrate including a calibration material, in accordance with various embodiments.

FIG. 4 is a side view of the substrate of FIG. 3, in accordance with various embodiments.

FIG. 5 is a curve of height versus step number for the calibration material of FIG. 3, in accordance with various embodiments.

FIG. 6 is a top view of the substrate of FIG. 3, illustrating fiducial markers disposed on the calibration material, in accordance with various embodiments.

FIG. 7 is a side view of the substrate and fiducial markers of FIG. 6, in accordance with various embodiments.

FIG. 8 is a calibration curve relating an optical metric to step height corresponding to the substrate of FIG. 3, in accordance with various embodiments.

DETAILED DESCRIPTION

Figure 1:
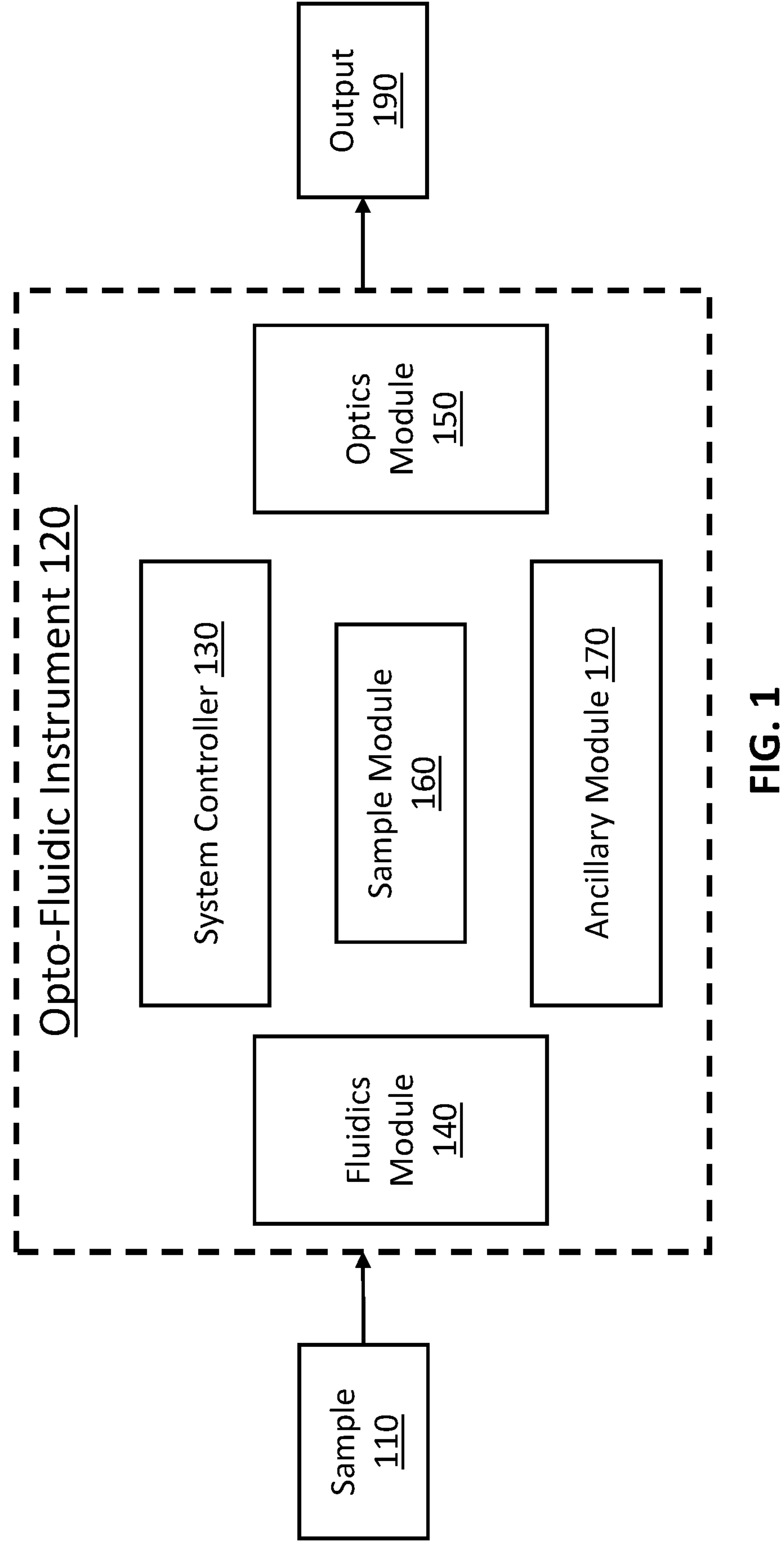
FIG. 1 illustrates a schematic diagram of an opto-fluidic instrument configured for imaging of biological specimens, in accordance with various embodiments.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

I. Overview

Imaging methods, such as wide field microscopy, can be used to determine optical properties of features that are positioned on and/or within biological samples (e.g., fiducial markers disposed on the sample, fluorescently tagged molecular targets within the sample, etc.). In volumetric imaging of a biological sample (e.g., sequentially obtaining z-stacks of images representing volumes of the sample), determining one or more physical parameters (e.g., height, width, length, etc.) of the biological sample may be necessary to efficiently and accurately image the sample volume. In various embodiments, thickness (i.e., z-height) across at least a portion of the sample (e.g., a maximum thickness) is needed to thereby determine the number of slices and a delta between slices for the z-stacks of images. Some experimental procedures require height measurements of biological tissue that may initially be in a dried state and subsequently hydrated. However, even with dimensional information of samples prior to preparing the samples for an experiment, the true dimensions during the experiment may change and determining physical parameters (e.g., height) of samples during experiments may be difficult due to unknown changes in dimensions (e.g., due to hydration), forces exerted on the sample (e.g., due to dispensing and extraction of reagents), varying tissue thickness, non-flat sample substrate or a substrate that is not planar with the horizon when secured in an analysis device, and/or other confounding factors depending on the state of the tissue. A biological sample may be supplied as a fresh frozen tissue (which may need thawed) or may be formalin-fixed, paraffin embedded (FFPE) tissue. The tissue sample may require various preparation steps before the sample can be analyzed in an analysis system. During these preparation steps (also during analysis), the sample may be contacted with one or more aqueous solutions, which may change the dimensions of the sample (e.g., if the sample absorbs water from the solution). Varying thickness or varying materials can also cause the biological sample to expand at different rates.

Various embodiments of the systems and methods disclosed herein relate to using fiducial markers to determine optical metrics associated with biological samples, which can then be used to determine physical parameters of the biological sample (e.g., height). To enable height measurement of tissue in both hydrated and dried states, one or more calibration models may be generated using calibration samples having known heights. After one or more calibration models are determined using fiducial markers on samples having known height(s), the calibration models may be used to determine dimensions (e.g., height, width, length, etc.) of biological samples in dried or hydrated states having unknown dimensions. Height determination of biological samples may then facilitate efficient sampling in a z-direction to reduce excess image collection, which may decrease overall computational cost of imaging samples. In addition, the ability to reliably determine physical parameters of biological samples in both dried and hydrated states may facilitate experimentation on a greater breadth of sample types (e.g., determining tissue response to liquid flow) without requiring excessive computational resources.

Target molecules (e.g., nucleic acids, proteins, antibodies, etc.) can be detected in biological samples (e.g., one or more cells or a tissue sample) using an instrument having integrated optics and fluidics modules (an "opto-fluidic instrument" or "opto-fluidic system"). In an opto-fluidic instrument, the fluidics module is configured to deliver one or more reagents (e.g., fluorescent probes) to the biological sample and/or remove spent reagents therefrom. Additionally, the optics module is configured to illuminate the biological sample with light having one or more spectral emission curves (over a range of wavelengths) and subsequently capture one or more images of emitted light signals from the biological sample during one or more probing cycles. In various embodiments, the captured images may be processed in real time and/or at a later time to determine the presence of the one or more target molecules in the biological sample, as well as three-dimensional position information associated with each detected target molecule. Additionally, the opto-fluidics instrument includes a sample module configured to receive (and, optionally, secure) one or more biological samples. In some instances, the sample module includes an X-Y stage configured to move the biological sample along an X-Y plane (e.g., perpendicular to an objective lens of the optics module).

In various embodiments, the opto-fluidic instrument is configured to analyze one or more target molecules in their naturally occurring place (i.e., in situ) within the biological sample. For example, an opto-fluidic instrument may be an in-situ analysis system used to analyze a biological sample and detect target molecules including but not limited to DNA, RNA, proteins, antibodies, and/or the like.

A sample disclosed herein can be or be derived from any biological sample. Biological samples may be obtained from any suitable source using any of a variety of techniques including, but not limited to, biopsy, surgery, and laser capture microscopy (LCM), and generally includes cells, tissues, and/or other biological material from the subject. A biological sample can be obtained from a prokaryote such as a bacterium, an archaea, a virus, or a viroid. A biological sample can also be obtained from non-mammalian organisms (e.g., a plant, an insect, an arachnid, a nematode, a fungus, or an amphibian). A biological sample can also be obtained from a eukaryote, such as a tissue sample from a mammal. A biological sample from an organism may comprise one or more other organisms or components therefrom. For example, a mammalian tissue section may comprise a prion, a viroid, a virus, a bacterium, a fungus, or components from other organisms, in addition to mammalian cells and non-cellular tissue components. Subjects from which biological samples can be obtained can be healthy or asymptomatic subjects, subjects that have or are suspected of having a disease (e.g., an individual with a disease such as cancer) or a pre-disposition to a disease, and/or subjects in need of therapy or suspected of needing therapy.

The biological sample can include any number of macromolecules, for example, cellular macromolecules and organelles (e.g., mitochondria and nuclei). The biological sample can be obtained as a tissue sample, such as a tissue section, biopsy, a core biopsy, needle aspirate, or fine needle aspirate. The sample can be a fluid sample, such as a blood sample, urine sample, or saliva sample. The sample can be a skin sample, a colon sample, a cheek swab, a histology sample, a histopathology sample, a plasma or serum sample, a tumor sample, living cells, cultured cells, a clinical sample such as, for example, whole blood or blood-derived products, blood cells, or cultured tissues or cells, including cell suspensions.

In some embodiments, the biological sample may comprise cells or a tissue sample which are deposited on a substrate. As described herein, a substrate can be any support that is insoluble in aqueous liquid and allows for positioning of biological samples, analytes, features, and/or reagents on the support. In some embodiments, a biological sample is attached to a substrate. In some embodiments, the substrate is optically transparent to facilitate analysis on the opto-fluidic instruments disclosed herein. For example, in some instances, the substrate is a glass substrate (e.g., a microscopy slide, cover slip, or other glass substrate). Attachment of the biological sample can be irreversible or reversible, depending upon the nature of the sample and subsequent steps in the analytical method. In certain embodiments, the sample can be attached to the substrate reversibly by applying a suitable polymer coating to the substrate and contacting the sample to the polymer coating. The sample can then be detached from the substrate, e.g., using an organic solvent that at least partially dissolves the polymer coating. Hydrogels are examples of polymers that are suitable for this purpose. In some embodiments, the substrate can be coated or functionalized with one or more substances to facilitate attachment of the sample to the substrate. Suitable substances that can be used to coat or functionalize the substrate include, but are not limited to, lectins, poly-lysine, antibodies, and polysaccharides.

It is to be noted that, although the above discussion relates to an opto-fluidic instrument that can be used for in situ target molecule detection via probe hybridization, the discussion herein equally applies to any opto-fluidic instrument that employs any imaging or target molecule detection technique. That is, for example, an opto-fluidic instrument may include a fluidics module that includes fluids needed for establishing the experimental conditions required for the probing of target molecules in the sample. Further, such an opto-fluidic instrument may also include a sample module configured to receive the sample, and an optics module including an imaging system for illuminating (e.g., exciting one or more fluorescent probes within the sample) and/or imaging light signals received from the probed sample. The in-situ analysis system may also include other ancillary modules configured to facilitate the operation of the opto-fluidic instrument, such as, but not limited to, cooling systems, motion calibration systems, etc.

II. Exemplary Descriptions of Terms

As used herein the specification, “a” or “an” may mean one or more. As used herein in the claim(s), when used in conjunction with the word “comprising,” the words “a” or “an” may mean one or more than one. Some embodiments of the disclosure may consist of or consist essentially of one or more elements, method steps, and/or methods of the disclosure. It is contemplated that any method or composition described herein can be implemented with respect to any other method or composition described herein and that different embodiments may be combined.

The use of the term “or” in the claims is used to mean “and/or” unless explicitly indicated to refer to alternatives only or the alternatives are mutually exclusive, although the disclosure supports a definition that refers to only alternatives and “and/or.” For example, “x, y, and/or z” can refer to “x” alone, “y” alone, “z” alone, “x, y, and z,” “(x and y) or z,” “x or (y and z),” or “x or y or z.” It is specifically contemplated that x, y, or z may be specifically excluded from an embodiment. As used herein “another” may mean at least a second or more.

The term “ones” means more than one.

As used herein, the term “plurality” may be 2, 3, 4, 5, 6, 7, 8, 9, 10, or more.

As used herein, the term “set of” means one or more. For example, a set of items includes one or more items.

As used herein, the phrase “at least one of,” when used with a list of items, means different combinations of one or more of the listed items may be used and only one of the items in the list may be needed. The item may be a particular object, thing, step, operation, process, or category. In other words, “at least one of” means any combination of items or number of items may be used from the list, but not all of the items in the list may be required. For example, without limitation, “at least one of item A, item B, or item C” means item A; item A and item B; item B; item A, item B, and item C; item B and item C; or item A and C. In some cases, “at least one of item A, item B, or item C” means, but is not limited to, two of item A, one of item B, and ten of item C; four of item B and seven of item C; or some other suitable combination.

As used herein, “substantially” means sufficient to work for the intended purpose. The term “substantially” thus allows for minor, insignificant variations from an absolute or perfect state, dimension, measurement, result, or the like such as would be expected by a person of ordinary skill in the field but that do not appreciably affect overall performance. When used with respect to numerical values or parameters or characteristics that can be expressed as numerical values, “substantially” means within ten percent.

As used herein, the term “about” refers to include the usual error range for the respective value readily known. Reference to “about” a value or parameter herein includes (and describes) embodiments that are directed to that value or parameter per se. For example, description referring to “about X” includes description of “X”. In some embodiments, “about” may refer to ±15%, ±10%, ±5%, or ±1% as understood by a person of skill in the art.

While the present teachings are described in conjunction with various embodiments, it is not intended that the present teachings be limited to such various embodiments. On the contrary, the present teachings encompass various alternatives, modifications, and equivalents, as will be appreciated by those of skill in the art.

In describing the various embodiments, the specification may have presented a method and/or process as a particular sequence of steps. However, to the extent that the method or process does not rely on the particular order of steps set forth herein, the method or process should not be limited to the particular sequence of steps described, and one skilled in the art can readily appreciate that the sequences may be varied and still remain within the spirit and scope of the various embodiments.

Throughout this specification, unless the context requires otherwise, the words “comprise”, “comprises” and “comprising” will be understood to imply the inclusion of a stated step or element or group of steps or elements but not the exclusion of any other step or element or group of steps or elements. By “consisting of” is meant including, and limited to, whatever follows the phrase “consisting of.” Thus, the phrase “consisting of” indicates that the listed elements are required or mandatory, and that no other elements may be present. By “consisting essentially of” is meant including any elements listed after the phrase, and limited to other elements that do not interfere with or contribute to the activity or action specified in the disclosure for the listed elements. Thus, the phrase “consisting essentially of” indicates that the listed elements are required or mandatory, but that no other elements are optional and may or may not be present depending upon whether or not they affect the activity or action of the listed elements.

Reference throughout this specification to “one embodiment,” “an embodiment,” “a particular embodiment,” “a related embodiment,” “a certain embodiment,” “an additional embodiment,” or “a further embodiment” or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in various embodiments.

III. Opto-Fluidic Instruments for Analysis of Biological Samples

FIG. 1 illustrates a schematic diagram of an opto-fluidic instrument 120 configured for imaging of biological specimens, in accordance with various embodiments. As illustrated in FIG. 1, the opto-fluidic instrument 120 is configured for analyzing a sample 110 to generate an output 190.

In various embodiments, the sample 110 can be a biological sample (e.g., a tissue) that includes molecules targeted for analysis (i.e., target molecules), such as DNA, RNA, proteins, antibodies, etc. In various embodiments, the biological sample is a fresh frozen tissue. In various embodiments, the biological sample is a formalin-fixed paraffin-embedded (FFPE) sample. For example, the sample 110 can be a sectioned tissue that is treated to access the RNA thereof for labeling with circularizable DNA probes. In various embodiments, ligation of the probes generates a circular DNA probe which can be enzymatically amplified and bound with fluorescent oligonucleotides to produce a sufficiently bright signal that facilitates image acquisition and has a high signal-to-noise ratio.

In various embodiments, the sample 110 may be placed in the opto-fluidic instrument 120 for analysis and detection of the target molecules in the sample 110. In various embodiments, the opto-fluidic instrument 120 can be a system configured to facilitate the experimental conditions conducive for the detection of the molecules. For example, the opto-fluidic instrument 120 can include a fluidics module 140, an optics module 150, a sample module 160, and at least one ancillary module 170, and these modules may be operated by a system controller 130 to create the experimental conditions for the probing of the target molecules in the sample 110 by selected probes (e.g., circularizable DNA probes), as well as to facilitate the imaging of the probed sample (e.g., by an imaging system of the optics module 150). In various embodiments, the various modules of the opto-fluidic instrument 120 may be separate components. In various embodiments, the various modules of the opto-fluid instrument may be in electrical communication with each other. In various embodiments, at least some of the modules of the opto-fluidic instrument 120 may be integrated together into a single module.

In various embodiments, the sample module 160 may be configured to receive the sample 110 in the opto-fluidic instrument 120. For instance, the sample module 160 may include a sample interface module (SIM) that is configured to receive a sample device (e.g., cassette) in which a substrate (having the sample 110 positioned thereon) can be secured. In various embodiments, the substrate is a glass slide. That is, the sample 110 may be placed in the opto-fluidic instrument 120 by securing the substrate having the sample 110 (e.g., the sectioned tissue) within the sample device that is then inserted into the SIM of the sample module 160. In various embodiments, the SIM includes an alignment mechanism configured to secure the sample device within the SIM and align the sample device in X, Y, and Z axes within the SIM. In some instances, the sample module 160 may also include an X-Y stage onto which the SIM is mounted. The X-Y stage may be configured to move the SIM mounted thereon (e.g., and as such the sample device containing the sample 110 inserted therein) in perpendicular directions along a two-dimensional (2D) plane of the opto-fluidic instrument 120. Additional discussion related to the SIM can be found in Applicant’s U.S. application Ser. No. 18/328,200, filed Jun. 2, 2023, titled “Methods, Systems, and Devices for Sample Interface,” which is incorporated herein by reference in its entirety.

The experimental conditions that are conducive for the detection of the target molecules in the sample 110 may depend on the target molecule detection technique that is employed by the opto-fluidic instrument 120. For example, in various embodiments, the opto-fluidic instrument 120 can be a system that is configured to detect molecules in the sample 110 via sequencing by hybridization (SBH) technique. In such cases, the experimental conditions can be molecule hybridization conditions that result in the intensity of hybridization of the target molecule (e.g., nucleic acid) to a probe (e.g., oligonucleotide) being significantly higher when the probe sequence is perfectly complementary to the target molecule than when there is a single-base mismatch. The hybridization conditions include the preparation of the sample 110 using reagents such as washing/stripping reagents, hybridizing reagents, etc., and such reagents may be provided by the fluidics module 140.

In various embodiments, the fluidics module 140 may include one or more components that may be used for storing the reagents, as well as for transporting said reagents to and from the sample device containing the sample 110. For example, the fluidics module 140 may include one or more reservoirs configured to store the reagents, as well as a waste container configured for collecting the reagents (e.g., and other waste) after use by the opto-fluidic instrument 120 to analyze and detect the molecules of the sample 110. In various embodiments, the one or more reservoirs include one or more high use reagent reservoirs. In various embodiments, the fluidics module 140 may be configured to receive one or more low use reagent plates (e.g., a 96 deep well plate). Further, the fluidics module 140 may also include pumps, tubes, pipettes, etc., that are configured to facilitate the transport of the one or more reagents (such non-limiting examples may include high use reagent and/or low use reagent) to the sample device and thus contact the sample 110 with the reagent (such non-limiting examples may include high use reagent and/or low use reagent). For instance, the fluidics module 140 may include one or more pumps ("reagent pumps") that are configured to pump washing and/or stripping reagents (i.e., high use reagents) to the sample device for use in washing and/or stripping the sample 110. In various embodiments, the fluidics module 140 may be configured for other washing functions such as washing an objective lens of the imaging system of the optics module 150.

In various embodiments, the ancillary module 170 includes a cooling system (i.e., a heat transfer system) of the opto-fluidic instrument 120. In various embodiments, the cooling system includes a network of coolant-carrying tubes configured to transport coolant to various modules of the opto-fluidic instrument 120 for regulating the temperatures thereof. In such cases, the ancillary module 170 may include one or more heat transfer components of a heat transfer circuit. In various embodiments, the heat transfer components include one or more coolant reservoirs for storing coolants and pumps (e.g., "coolant pumps") for generating a pressure differential, thereby forcing the coolants to flow from the reservoirs to the various modules of the opto-fluidic instrument 120 via the coolant-carrying tubes. In some instances, the heat transfer components of the ancillary module 170 may include returning coolant reservoirs that may be configured to receive and store returning coolants, i.e., heated coolants flowing back into the returning coolant reservoirs after absorbing heat discharged by the various modules of the opto-fluidic instrument 120. In such cases, the ancillary module 170 may also include one or more cooling fans that are configured to force air (e.g., cool and/or ambient air) to the external surfaces of the returning coolant reservoirs to thereby cool the heated coolant(s) stored therein. In some instance, the ancillary module 170 may also include one or more cooling fans that are configured to force air directly to one or more components of the opto-fluidic instrument 120 so as to cool said one or more components. For one non-limiting example, the ancillary module 170 may include cooling fans that are configured to directly cool by forcing ambient air past the system controller 130 to thereby cool the system controller 130.

As discussed above, the opto-fluidic instrument 120 may include an optics module 150 which include the various optical components of the opto-fluidic instrument 120, such as but not limited to a camera, an illumination module (such non-limiting examples may include one or more LEDs and/or one or more lasers), an objective lens, and/or the like. The optics module 150 may be a fluorescence imaging system that is configured to image the fluorescence emitted by the probes (e.g., oligonucleotides) in the sample 110 after the probes are excited by light from the illumination module of the optics module 150. In some instances, the optics module 150 may also include an optical frame onto which the camera, the illumination module, and/or the X-Y stage of the sample module 160 may be mounted.

In various embodiments, the system controller 130 may be configured to control the operations of the opto-fluidic instrument 120 (e.g., and the operations of one or more modules thereof). In some instances, the system controller 130 may take various forms, including a processor, a single computer (or computer system), or multiple computers in communication with each other. In various embodiments, the system controller 130 may be communicatively coupled with data storage, set of input devices, display system, or a combination thereof. In some cases, some or all of these components may be considered to be part of or otherwise integrated with the system controller 130, may be separate components in communication with each other, or may be integrated together. In other examples, the system controller 130 can be, or may be in communication with, a cloud computing platform.

In various embodiments, the opto-fluidic instrument 120 is configured to analyze the sample 110 and generate the output 190 that includes indications of the presence of the target molecules in the sample 110. For instance, with respect to the example embodiment discussed above where the opto-fluidic instrument 120 employs the SBH technique for detecting molecules, the opto-fluidic instrument 120 may cause the sample 110 to undergo successive rounds of fluorescent probe hybridization and be imaged to detect target molecules in the probed sample 110. In such cases, the output 190 may include optical signatures specific to each gene, which allow the identification of the target molecules.

Figure 2:
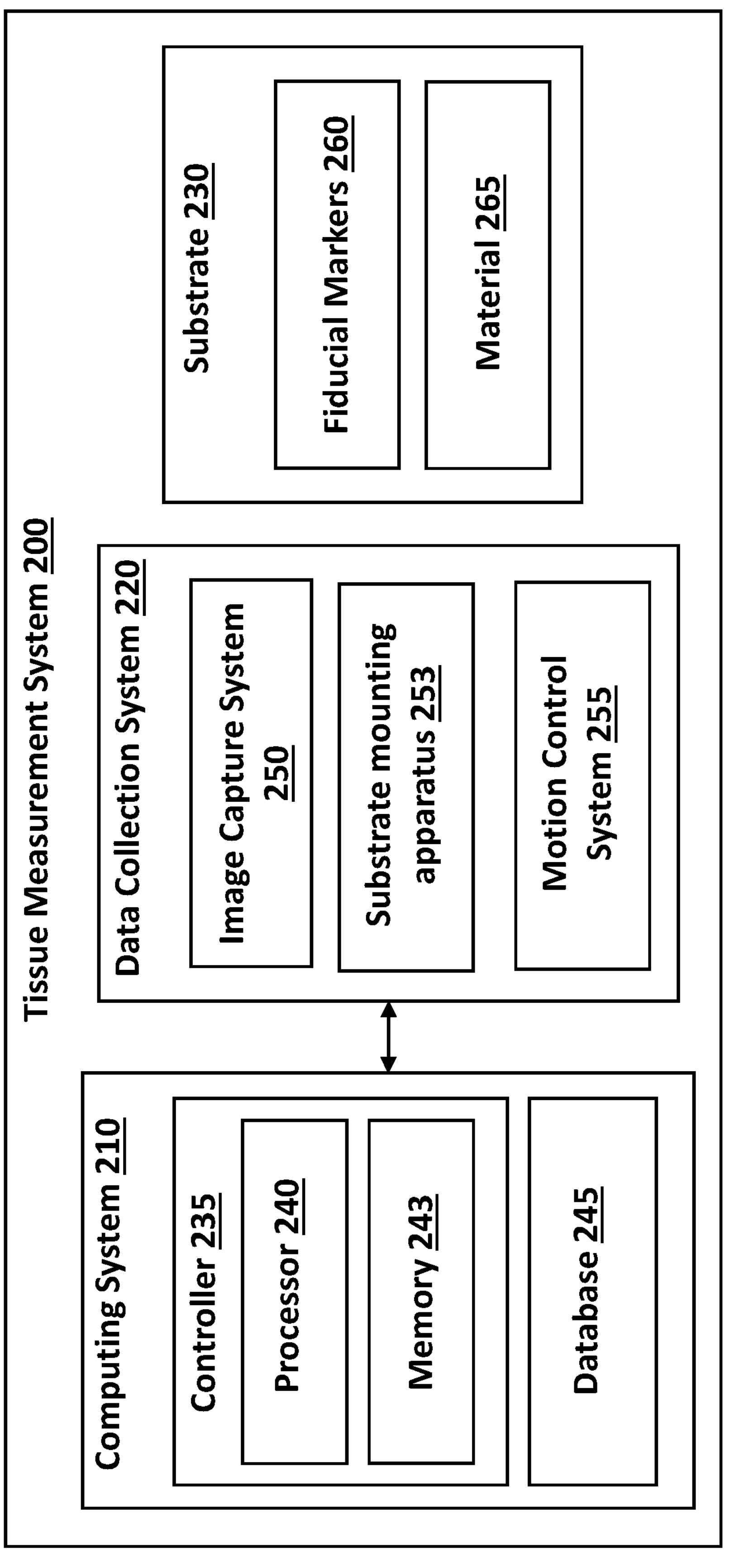
FIG. 2 is a schematic representation of a tissue measurement system, in accordance with various embodiments.

FIG. 2 is a schematic representation of a tissue measurement system 200, according to at least one embodiment. As shown, the tissue measurement system 200 includes at least one computing system 210, at least one data collection system 220, and at least one substrate 230. The computing system 210 includes at least one controller 235. The controller 235 includes at least one processor 240 and a non-transitory computer readable medium (e.g., a memory 243) having computer-readable instructions stored thereon that, when executed by the processor 240, cause the controller 235 to carry out one or more operations. In various embodiments, the at least one controller 235 is a computing device (e.g., a microcomputer, microcontroller, or microprocessor). In other embodiments, the at least one controller 235 is configured as part of a data cloud computing system configured to receive commands from a user control device and/or remote computing device. The computing system 210 may also include at least one database 245 (e.g., cloud or distributed database, centralized database, object-oriented database, etc.), where the at least one controller 235 may be communicably coupled to the database 245 such that the controller 235 may be configured to store information within the database 245 and retrieve information from the database 245.

As shown in FIG. 2, the tissue measurement system 200 also includes a data collection system 220, which may be in communication with the computing system 210. The data collection system 220 may include at least one image capture system 250, at least one substrate mounting apparatus 253, and at least one motion control system 255. In various embodiments, the image capture system 250 may be a flying spot scanner type system or a focal plane array type system. In other embodiments, the image capture system 250 may include at least one solid-state detector, such as a charge-coupled device (CCD), a charge-injection device (CID), or a complementary-metal-oxide-semiconductor detector (CMOS). In yet other embodiments, the image capture system 250 may include one or more cameras, photodiodes, photoconductors, junction photodetectors, or any other optical sensor type (e.g., resonance, dispersion, reflection, refraction, phosphorescence, infrared absorption, Raman scattering, fluorescence, chemiluminescence, etc.). In various embodiments, the image capture system 250 may include one or more light sources.

In various embodiments, the substrate mounting apparatus 253 may include a platform or stage upon which one or more substrates 230 (e.g., microscope slides, specimens, etc.) may be placed and secured for optical analysis. The substrate mounting apparatus 253 may include one or more clips, levers, ridges, recesses, or any other suitable features to facilitate securing the substrate 230. The substrate mounting apparatus 253 may be operably coupled to the at least one motion control system 255, which may include one or more controllers in communication with one or more actuators (e.g., motors), where the one or more actuators are configured to adjust a position of the substrate mounting apparatus 253 in three-dimensional (3D) space responsive to a control signal from the one or more controllers of the motion control system 255. For example, in some embodiments, the motion control system 255 may be configured to adjust a position of the substrate mounting apparatus 253 relative to the image capture system 250 to facilitate image capture of one or more features of the substrate 230. In some embodiments, the motion control system 255 may be configured to move the substrate mounting apparatus 253 according to a predetermined pattern such that the image capture system 250 may obtain images according to a predetermined pattern or sequence. In various embodiments, the image capture system 250, the substrate mounting apparatus 253, and the motion control system 255 may be structured as separate systems, each communicatively coupled with each other to facilitate collection of data related to the substrate 230. In other embodiments, the image capture system 250 and the substrate mounting apparatus 253 may be disposed within a single device, such as a laser scanning confocal microscope (LSCM).

As described above, the data collection system 220 is configured to collect one or more data points related to the substrate 230. Data collected by the data collection system 220 (e.g., image data captured by the image capture system 250) may be transmitted to the controller 235 and stored in the memory 243 and/or the database 245. For example, the data collection system 220 may be configured to determine one or more physical parameters (e.g., height, volume, etc.) of a material 265 disposed on the substrate 230. In various embodiments, the data collection system 220 is configured to generate a 3D image of the substrate 230 by repeatedly capturing a plurality of images of the substrate 230 by collecting images of sections of the substrate 230 and processing (e.g., by the processor 240) the plurality of images to register the images (e.g., within the same FOV, across all color channels, across all cycles) to one another. In various embodiments, the data collection system 220 is configured to capture images of the substrate 230 (and of the material 265 disposed thereon) at different heights (e.g., different heights of the substrate 230 and/or of the material 265 disposed thereon), latitudinal, and/or longitudinal directions.

In various embodiments, the substrate 230 is made of a glass (e.g., a glass configured to be used as a microscope slide). In various embodiments, the substrate 230 is made of another suitable material (e.g., metal, plastic, composite, etc.) on to which the material 265 may be disposed or deposited. In various embodiments, the substrate 230 is coated with a coating (e.g., a hydrophobic coating, a hydrophilic coating, etc.). In various embodiments, the material 265 may a biological sample (e.g., tissue) or a non-biological sample. To determine the one or more physical parameters (e.g., height) of the material 265, one or more fiducial markers 260 may be used. In various embodiments, the one or more fiducial markers 260 may be positioned on the material 265 and used during image capture of the material 265 (e.g., via the image capture system 250) to determine the one or more physical parameters.

Because image capture and image processing steps may be time consuming and/or computationally expensive, it would be advantageous to provide a system and method for reducing oversampling (e.g., reducing a number of excess images captured and/or processed by the system 220) of a sample having unknown height(s). In particular, it would be advantageous to reduce oversampling in an out-of-plane direction (e.g., z-direction corresponding to a height of the substrate 230 and the material 265). In various embodiments, determination of one or more heights (e.g., a maximum height and/or a plurality of heights) of the material 265 and/or the substrate 230 would be advantageous for determining an imageable volume of the material 265 (e.g., determining the volumetric bounds of the material 265). In various embodiments, one or more heights (e.g., a maximum height), a width, and/or a length of the sample are used to determine an imageable volume. In various embodiments, the imageable volume of the material 265 may be defined or characterized based on a number of z-stacks, which are defined as a compilation or collection of images collected at a set interval between a first plane of focus and a second plane of focus. The image capture system 250 may be configured to collect images of the material 265 at different planes of focus, where the collection of images form a z-stack associated with the material 265. In various embodiments, the image capture system 250 is configured to collect a plurality of z-stacks, where each z-stack represents a different field of view of the sample. Determining an imageable volume of the material 265 may reduce excess image capture from regions or sections outside the bounds of the material 265 (e.g., in the x, y, and/or z directions).

In various embodiments, the fiducial markers 260 are used to determine a height of the material 265. Also as described above, the material 265 may be a biological tissue, which may have a variable or non-uniform height (e.g., depending on whether the tissue is in a dried or hydrated state). Accordingly, the data collection system 220 may be calibrated using the fiducial markers 260 disposed at predetermined heights such that accurate and precise height information may be obtained for a sample (e.g., the material 265). In various embodiments, the sample has substantially a same height. In various embodiments, the sample has a variable height. To perform calibration, a known material of known height may be disposed or deposited on a substrate, fiducial markers are then positioned on the substrate, and the fiducial markers are imaged using the data collection system 220, where information collected by the data collection system 220 may be communicated to the computing system 210, and where the computing system 210 is configured to correlate the collected data to the known heights and determine one or more calibration curves. In various embodiments, the fiducial markers are affixed (e.g., adhered or bonded) to the biological sample. In various embodiments, the fiducial markers are removed from the biological sample after the height(s) of the sample are determined.

In various embodiments, one or more calibration curves are determined using calibration samples that have predetermined values (e.g., a sample having steps at various predetermined heights, having predetermined widths and/or predetermined lengths). For example, a calibration sample can be manufactured with known step heights. In various embodiments, the calibration sample is manufactured with high-precision step heights (e.g., having sub-nanometer level precision). In various embodiments, when fiducial markers are deposited on the reference sample, the fiducial markers can be imaged relative to a reference focal plane, and bead diameters can be determined at each of the known step heights. In various embodiments, fiducial markers (e.g., beads) imaged outside of the focal plane will appear defocused and, thus, will have a larger diameter than the in-focus diameter of each fiducial marker. That is, given a plurality of fiducial markers having substantially the same diameter, if each fiducial marker was imaged in its most in-focus plane, each fiducial marker would have substantially the same size (e.g., diameter) as the other fiducial markers in the images. However, because the fiducial markers are imaged at different heights relative to a static reference focal plane, the fiducial markers that are further out of focus relative to the focal plane (e.g., at larger heights relative to the glass slide) will appear larger in size (e.g., diameter). In various embodiments, one or more calibration curves can be determined by measuring the defocus bead diameter and plotting the defocus bead diameter against the height and interpolating a line or curve between the known points. In various embodiments, once the calibration curve(s) is determined, fiducial markers are deposited on a sample having unknown thickness, the fiducial markers are imaged, and the defocus bead diameters measured to thereby determine (e.g., interpolate or extrapolate) heights based on the obtained calibration curve(s).

In various embodiments, the fluorescent markers are illuminated by an illumination module to thereby cause the fiducial markers to emit light signals. In various embodiments, feature data is obtained for each light signal (associated with the fiducial markers) in the image. In various embodiments, the feature data includes signal intensity (e.g., an analog intensity value between 0 and 12,000). In various embodiments, the signal intensity is a normalized signal intensity. In various embodiments, the feature data includes a shape identifier. In various embodiments, the feature data includes a shape similarity metric (e.g., a number in a range of 0 to 1 representing similarity to a Gaussian shape). In various embodiments, the feature data includes a signal-to-noise ratio. In various embodiments, the feature data includes statistical parameters such as mean, median, standard deviation of one or more variables (e.g., noise, signal intensity, etc.). In various embodiments, determining the feature data includes blob detection. In various embodiments, blob detection includes a maximum intensity projection (MIP). In various embodiments, blob detection includes a volumetric peak detection. In various embodiments, blob detection includes a white top-hat transform. In various embodiments, blob detection includes fitting a Gaussian blob to each light signal. In various embodiments, blob detection includes a Laplacian of a Gaussian approach. In various embodiments, blob detection includes a difference of Gaussians approach. In various embodiments, blob detection includes a determinant of Hessian approach. In various embodiments, blob detection includes a hybrid Hessian-Laplace approach. In various embodiments, the feature data includes three-dimensional positional information for each light signal. In various embodiments, the feature data includes three-dimensional positional information for each blob. In various embodiments, the three-dimensional positional information is at sub-pixel resolution. In various embodiments, shapes (e.g., Gaussians) are fitted to light signals in the image and centroids are determined for these shapes.

In various embodiments, shapes (e.g., Gaussians) are fitted to light signals in the image and centroids are determined for these shapes. In various embodiments, the feature data (e.g., Gaussian shape parameters and location) is used to generate a feature surface. In various embodiments, the feature surface (e.g., centroid, Gaussian parameters, etc.) from the image is used to obtain measurements for each light signal.

Figures 3, 4, 5:
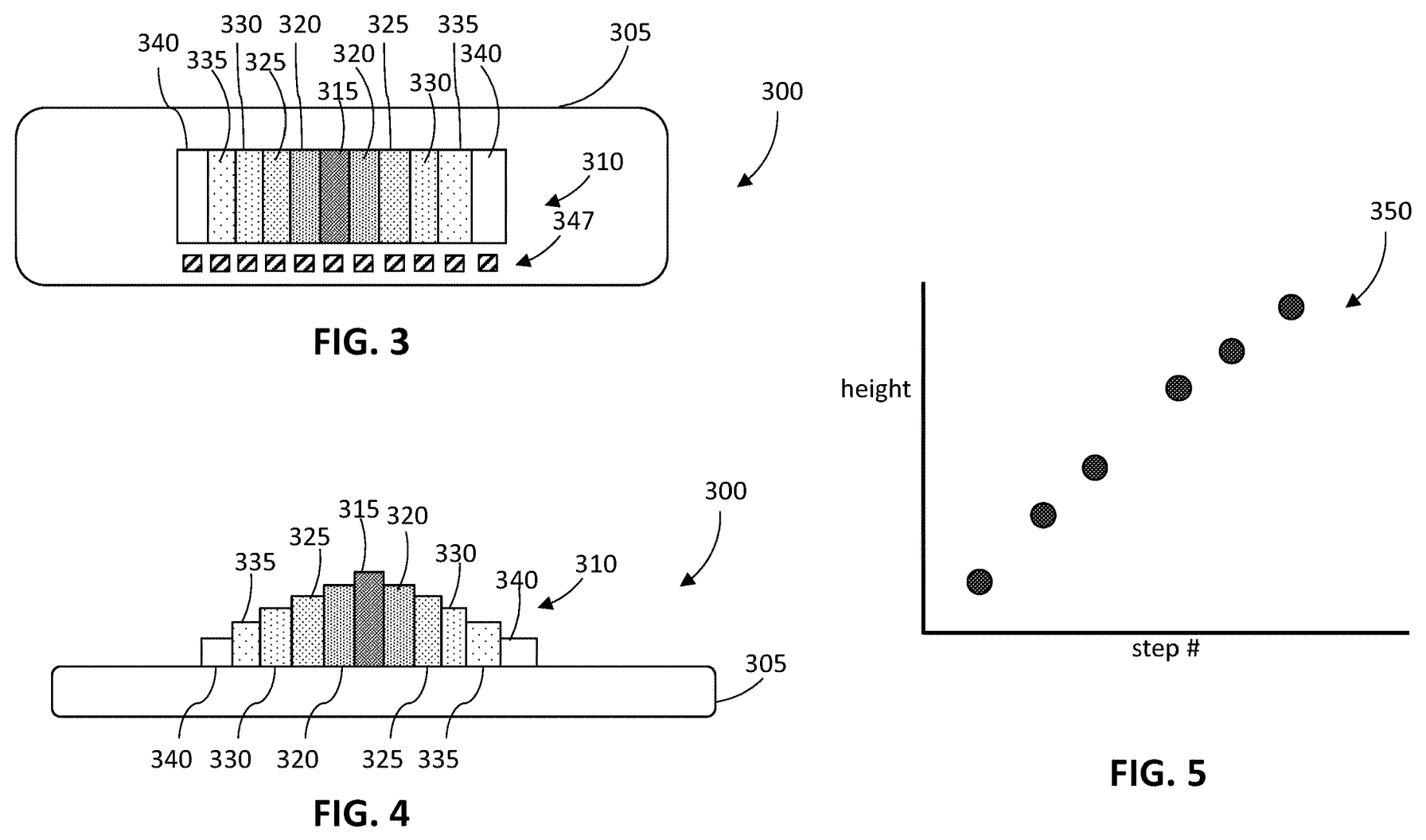

FIGS. 3 and 4 show top and side views, respectively, of a calibration assembly 300, which may be used for calibration of the data collection system 220. The calibration assembly 300 includes a substrate 305 (which may be similar or equivalent to the substrate 230). The substrate 305 may be, for example, a glass microscope slide. The substrate 305 includes a calibration material 310 disposed thereon, where the calibration material 310 includes a plurality of surfaces having at least one known height or is provided with a representation of the height(s) (e.g., a continuous or piecewise function that can be used to determine the known height at one or more points along the calibration material 310). As shown in FIGS. 3 and 4, the calibration material 310 may include or be structured as a plurality of stepped sections 315, 320, 325, 330, 335, and 340, where each section defines a unique surface having a known height (e.g., as defined between an uppermost portion of each respective section 315, 320, 325, 330, 335, 340 and an uppermost surface of the substrate 305). In various embodiments, the known height of each of the stepped sections 315, 320, 325, 330, 335, 340 may be less than or equal to about 50 microns. In some embodiments, the height of at least one of the stepped sections 315, 320, 325, 330, 335, 340 may be less than or equal to about 1 micron. In some embodiments, the height of at least one of the stepped sections 315, 320, 325, 330, 335, 340 may be less than or equal to about 0.25 microns. In various embodiments, a change in height between adjacent stepped sections 315, 320, 325, 330, 335, 340 may range from approximately 0.1 micron to about 5 microns. In various embodiments, the calibration material 310 may be a biological or non-biological sample that is mounted to the substrate 305. In some embodiments, the calibration material 310 is a formed material that may be deposited or directly fabricated on the substrate 310 using one or more fabrication methods including, but not limited to, photopatterning/photolithography, micromilling, etching, injection molding, hot embossing, and 3D printing. As shown, the calibration material 310 may be structured to include, for example, 6 unique stepped sections (11 total steps), where an outermost section 340 may have a smallest height. The section 335 may be disposed adjacent the outermost section 340 and may have a height greater than the section 340 but smaller than another adjacent section 330. Similarly, the section 330 may have a height greater than the section 335 but smaller than a height of the section 325. The section 325 may likewise have a height greater than that of the section 330 but smaller than a height of the section 320. The section 320 may have a greater height than the section 325 but smaller than a height of the section 315. In various embodiments, a plot 350 of known heights versus step number may be linear (or substantially linear), such as shown in FIG. 5. Although FIGS. 3 and 4 depict the calibration material 310 having a substantially symmetrical arrangement (reflected about a plane defined by the z-height and long side of section 315, where the plane is located at the midpoint of the short side of section 315), in various embodiments, the calibration material 310 may have any suitable shape. In addition, although FIGS. 3 and 4 show each stepped section of the calibration material 310 being substantially rectangular, in various embodiments, each section may have any suitable shape. Similarly, the stepwise variation in height may differ from the arrangement shown. For example, the greatest height may be at a first end, and heights of each subsequent step may decrease incrementally until a step having a smallest height at an opposing second end.

In various embodiments, the calibration material is deposited on to the substrate in one or more depositing steps. In various embodiments, the calibration material is deposited on to the substrate using one or more patterns (e.g., one or more rectangular patterns). In various embodiments, the calibration material is deposited using a suitable technique having high tolerances so that step thickness is substantially accurate as sample thickness can be up to 20 μm and deltas between images in a z-stack can be less than 1 μm (e.g., steps between image planes in a z-stack can be 0.75 μm, 0.50 μm, 0.25 μm). In various embodiments, the calibration material is deposited on to the substrate using photolithography. For example, using an optical lithography method, the minimum feature is approximately 2 μm with a minimum alignment tolerance of approximately 1 μm. In another example, using an optical lithography method, the minimum feature is approximately 0.5 μm with a minimum alignment tolerance of approximately 0.2 μm. In yet another example, using an electron beam lithography method, the minimum feature is approximately 7 nm with a minimum alignment tolerance of approximately 1 nm.

In addition, as shown in FIG. 3, the substrate 305 may include one or more indicators 347, which indicate the known height of each of the stepped sections 315, 320, 325, 330, 335, and 340. In various embodiments, the one or more indicators 347 are a visual indicator (e.g., typeface label, alphanumeric indicator, binary code, etc.), a digitally readable indicator (e.g., barcode, QR code, etc.), tactile indicator (e.g., etched marking), or any other suitable indicator. In various embodiments, where the calibration material is fully or substantially transparent (at least enough to allow for visualization of indicators), the substrate includes indicators positioned directly below the calibration material (such that the calibration material is deposited on the indicator). In various embodiments, the substrate includes two or more indicators for each step along the calibration material. For example, the substrate can include two or more indicators (e.g., of the same or differing lengths) that correspond to distance markings (e.g., similar to a ruler). In various embodiments, the distance markings on the substrate correspond to positions of the fiducials (and thus, distances along the x-axis of the calibration curve). For example, each fiducial marker can be compared to the nearest indicators (e.g., horizontal distance markings) to assign a horizontal distance to each fiducial marker. In another example, a distance between two indicators can be interpolated for any fiducials that are positioned therebetween (e.g., between a centroid of the fiducial marker and the x-position of the two indicators).

Figures 6, 7, 8:
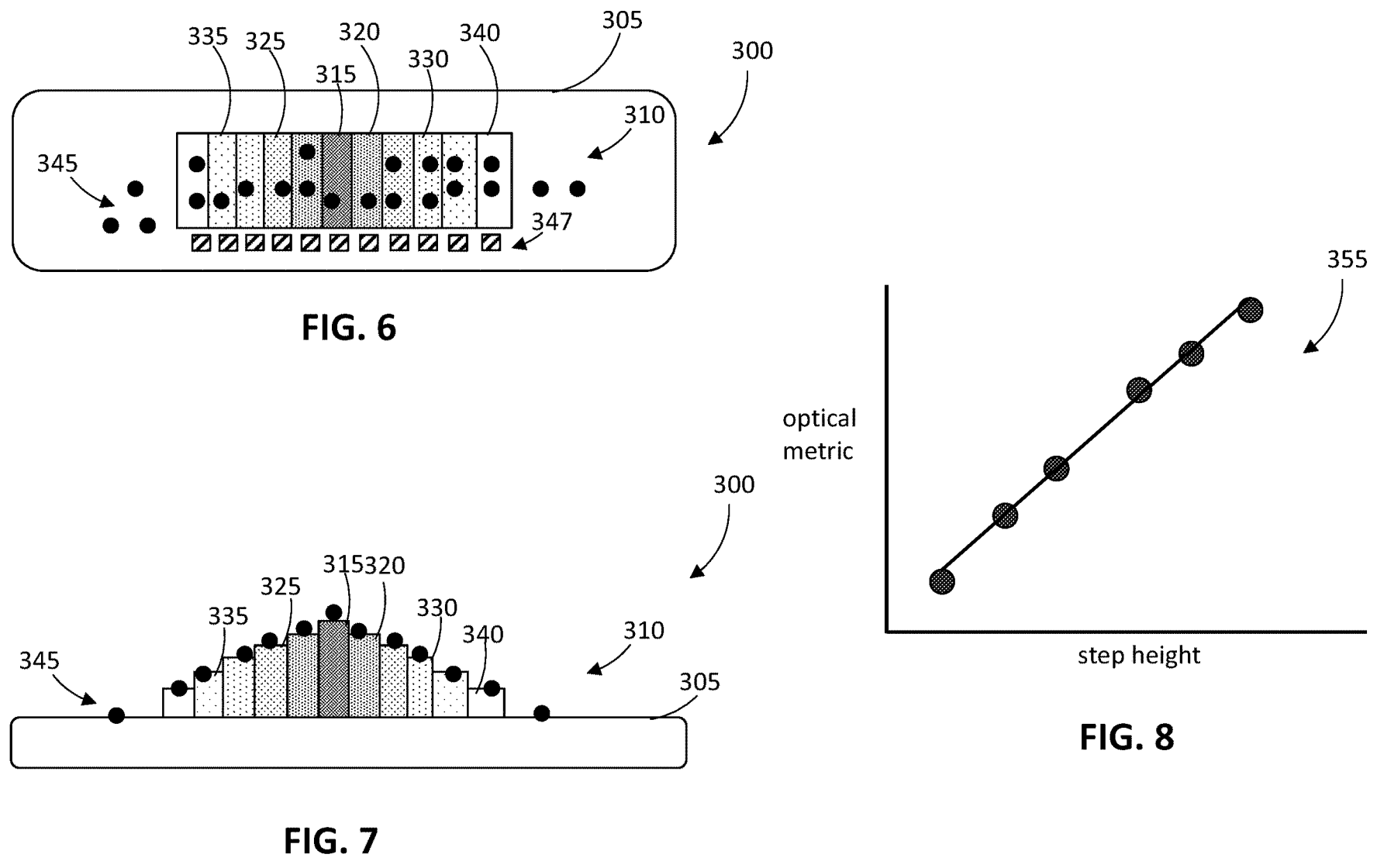

To calibrate the data collection system 220, a plurality of fiducial markers 345 may be disposed onto the calibration material 310 (e.g., on a surface of the calibration material 310). As shown in FIGS. 6 and 7, at least one fiducial marker of the plurality of fiducial markers 345 is disposed on each of the stepped sections 315, 320, 325, 330, 335, and 340. In some embodiments, two or more fiducial markers 345 are disposed on an uppermost surface of each of the stepped sections 315, 320, 325, 330, 335, 340. In some embodiments, a first set of two or more fiducial markers 345 may be disposed on a first side of the calibration material 310 and a second set of two or more fiducial markers 345 may be disposed on a second side of the calibration material 310. Accordingly, each of the plurality of fiducial markers 345 (e.g., each pair of the fiducial markers 345) may correspond to a known (e.g., predetermined) height associated with each of the stepped sections 315, 320, 325, 330, 335, 340 (where the height is defined relative to an upper surface of the substrate 305). In various embodiments, the plurality of fiducial markers 345 are substantially uniform in size and shape (e.g., all are substantially spherical, cuboidal, elliptical, stellate, etc.). In some embodiments, the plurality of fiducial markers 345 include fluorescent elements. In other embodiments, the plurality of fiducial markers 345 are fluorescent markers. In various embodiments, the plurality of fiducial markers 345 are configured to be excited in response to one or more light sources within the image capture system 250.

Once the fiducial markers 345 have been deposited (and, in some embodiments, adhered) on the calibration material 310, the data collection system 220 may capture a plurality of images of the calibration material 310 (and/or the substrate 305). The computing system 210 may determine one or more optical metrics associated with each of the fiducial markers 345 from the images collected by the data collection system 220. In various embodiments, the one or more optical metrics include a diameter of the fiducial marker (e.g., a defocused diameter) associated with each of the fiducial markers 345. In some embodiments, the data collection system 220 and the computing system 210 may determine a focal plane (e.g., for the substrate) and then determine the one or more optical metrics associated with the fiducial markers 345 while maintaining the same focal plane. In various embodiments, the focal plane may be determined using an auto-focus subsystem of the image capture system 250 (e.g., a hardware auto-focus configured to maintain a focal plane via a time of flight implementation). In various embodiments, the focal plane is a surface of the substrate (e.g., top or bottom surface of the substrate). In various embodiments, the focal plane is a surface of the calibration material 310 (e.g., highest surface of the calibration material, lowest surface of the calibration material, and intermediate surface of the calibration material, etc.) In some embodiments, the one or more optical metrics includes an intensity (e.g., an intensity of light emitted and/or reflected from the fiducial markers). In various embodiments, the at least one optical metric includes a shape (e.g., sphere, oblong ellipsoid, cube, trapezoid, etc.).

In various embodiments, the focal plane is a plane perpendicular to the optical axis (e.g., an axis that passes through the center of an objective lens) that includes the perfect point of focus. In various embodiments, the plane of focus can be determined via a hardware autofocus system (e.g., laser-based autofocus). In various embodiments, at the focal plane, contrast and sharpness are maximized. In various embodiments, when objects are outside of the focal plane (e.g., above or below the focal plane), the shapes of the objects may be distorted. For example, an object having a disk shape when imaged (e.g., a cylinder imaged from above or a sphere imaged from any angle) may appear to be a larger or smaller disk when the object is imaged out of the focal plane. In various embodiments, the shape (e.g., a disk) has intensity varying according to a Gaussian (e.g., highest intensity in the center and lower intensity towards the periphery). In various embodiments, any suitable shape may be measured for an optical metric, such that the shape has a distance that can be measured and compared between different image planes (e.g., both in-focus and out-of-focus planes). For example, a diameter of the defocused objects can be measured for various shapes (e.g., a defocused square shape may appear disk-like). In another example, the long diameter (or radius) and/or the short diameter (or radius) may be measured for elliptical shapes. In yet another example, a length and/or width may be measured for square or rectangular shapes.

Once the data collection system 220 has determined at least one optical metric (e.g., defocus diameter) associated with each of the fiducial markers 345 (e.g., via the image capture system 250), the computing system 210 may relate the optical metrics associated with each of the fiducial markers 345 to the corresponding known height of each of the fiducial markers 345. In some embodiments, the computing system 210 may generate a calibration curve 355, which relates the determined optical metrics to the predetermined heights (e.g., of the fiducial markers 345). An exemplary calibration curve is illustrated in FIG. 8. For fiducial markers disposed on steps having substantially a substantially same width and a substantially same delta thickness (Δt) between steps, the calibration curve will appear substantially linear (e.g., when the calibration data points are fitted to a curve). In various embodiments, the calibration curve is determined via a regression fitting of a line or curve (e.g., linear least squares, non-linear least squares, etc.) In various embodiments, the data collection system 220 and the computing system 210 may be configured to generate a plurality of calibration curves for the calibration material 310. In other embodiments, multiple calibration curves may be determined for a multitude of different calibration materials 310. For example, fiducial markers of different shapes can be used to generate two or more calibration curves, where each calibration curve corresponds to a specific shape of fiducial marker. In another example, fiducial markers of different colors can be used to generate two or more calibration curves where each calibration curve corresponds to a specific color of fiducial marker. In yet another example, fiducial markers having different light intensity emissions can be used to generate two or more calibration curves where each calibration curve corresponds to a specific emission intensity of fiducial marker. In various embodiments, the calibration curve (or multiple calibration curves) determined by or via the computing system 210 (e.g., by the controller 235) may be stored in the memory 243 and/or the database 245.

In various embodiments, the calibration sample 310 may also be used to calibrate the motion control system 255. For example, to capture images of the calibration sample 310, the motion control system 255 may adjust a position of the substrate mounting apparatus 253 to enable the image capture system 250 to collect images from one or more focal planes. Accordingly, for each stepped section 315, 320, 325, 330, 335, 340 having a different height and different focal plane, the computing system 210 may record a 3D position, a velocity, and/or an acceleration associated with the motion control system 255 for each stepped section 315, 320, 325, 330, 335, 340 and/or between each of the stepped sections 315, 320, 325, 330, 335, 340. Accordingly, the computing system 210 may then correlate one or more control signals sent to the motion control system 255 for adjusting the substrate mounting apparatus 253 during image capture of the calibration sample 310 to one or more heights and/or focal planes associated with each stepped section 315, 320, 325, 330, 335, 340. The computing system 210 may then use the correlation to calibrate movement of the motion control system 255 (e.g., by determining one or more control signals for causing the motion control system 255 to adjust a position of the substrate mounting apparatus 253).

After one or more calibration curves have been determined (e.g., by the computing system 210) or otherwise obtained for the calibration material 310, the tissue measurement system 200 may be used to measure one or more physical characteristics or metrics, such as a height, of a sample material. In various embodiments, the one or more calibration curves may be retrieved from a database (e.g., a local database or remote database) to be used for subsequent sample measurements.

Figures 9, 10, 11:
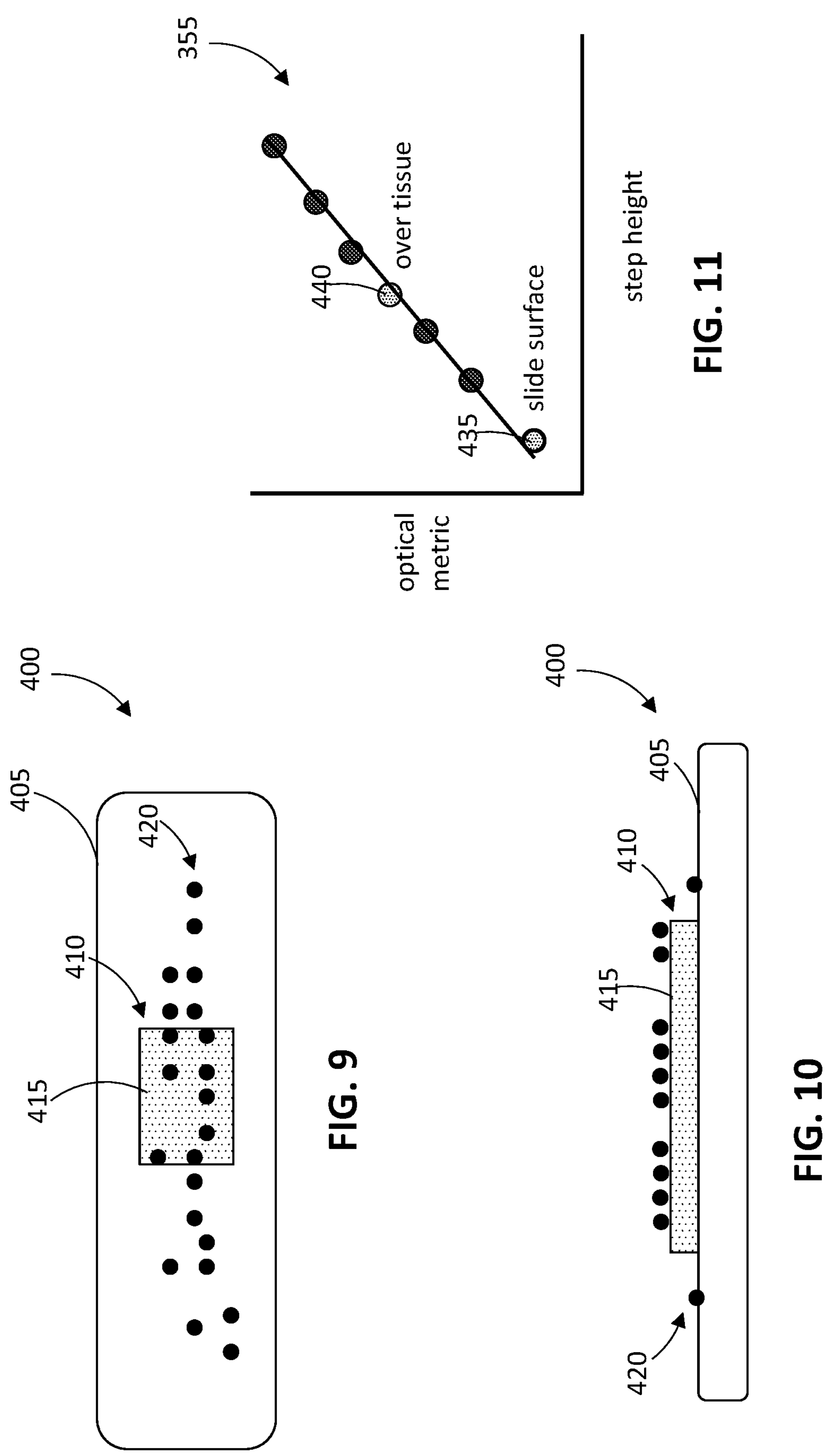
FIG. 9 is a top view of a substrate including a biological sample, in accordance with various embodiments.
FIG. 10 is a side view of the substrate of FIG. 9, in accordance with various embodiments.
FIG. 11 is a calibration curve used to determine thicknesses across the top surface of the biological sample of FIG. 10, in accordance with various embodiments.

FIGS. 9 and 10 show top and side views of a sample assembly 400, according to various embodiments. As shown in FIGS. 9 and 10, the sample assembly 400 includes a substrate 405 (similar or equivalent to the substrate 305), such as a microscope slide, upon which a sample material 410 is disposed. In various embodiments, the sample material 410 may be a biological sample or a non-biological sample. In some embodiments, the sample material 410 may be a hydrated or a dried biological tissue. In various embodiments, the sample material 410 may include a plurality of surfaces corresponding to a plurality of heights. In other embodiments, the sample material 410 may include a single surface having variable height. As shown in FIGS. 9 and 10, a plurality of fiducial markers 420 are disposed on a top surface 415 of the sample material 410. In various embodiments, the fiducial markers 420 may be uniformly distributed along the surface 415 of the sample material 410. In other embodiments, the fiducial markers 420 may be placed on one or more subsections (e.g., along a midline, about a periphery, within areas of greatest change in height, etc.). In various embodiments, the fiducial markers 420 are randomly distributed along the surface 415 of the sample material 410.

After the fiducial markers 420 are disposed on the sample material 410, the data collection system 220 may capture one or more images of the sample material 410 and the substrate 405. In various embodiments, a single image is captured of the entire sample material 410 at a single focal plane (e.g., a focal plane of the top surface of the substrate). In various embodiments, two or more images (e.g., each image representing a FOV of a portion of the sample) are captured. In various embodiments, FOVs are imaged until a single image can be generated (e.g., via stitching of a plurality of FOVs) representing the entire sample material 410. In various embodiments, each of the two or more images may be obtained using a same reference focal plane. In various embodiments, the multiple images are stitched together to form a single image of the sample material 410. The computing system 210 may then determine one or more optical metrics associated with the fiducial markers 420 (e.g., defocused diameter, intensity, focal plane, etc.). The computing system 210 may then cross-reference the optical metrics associated with the fiducial markers 420 with the one or more calibration curves 355 determined from the calibration material 310. The computing system 210 may then interpolate at least one height associated with the sample material 410 and/or the substrate 405 from the one or more calibration curves 355, as shown in FIG. 11. For example, the computing system 210 may interpolate a first height 435 associated with the substrate 405 based on the optical metric associated therewith. The computing system 210 may also interpolate at least one second height 440 associated with a height of the sample material 410. In this manner, the computing system 210 may use calibration data (e.g., calibration curves 355) determined from one or more calibration materials 310 to determine heights or other parameters associated with the sample material 410 (e.g., biological tissue).

Figures 12, 13, 14:
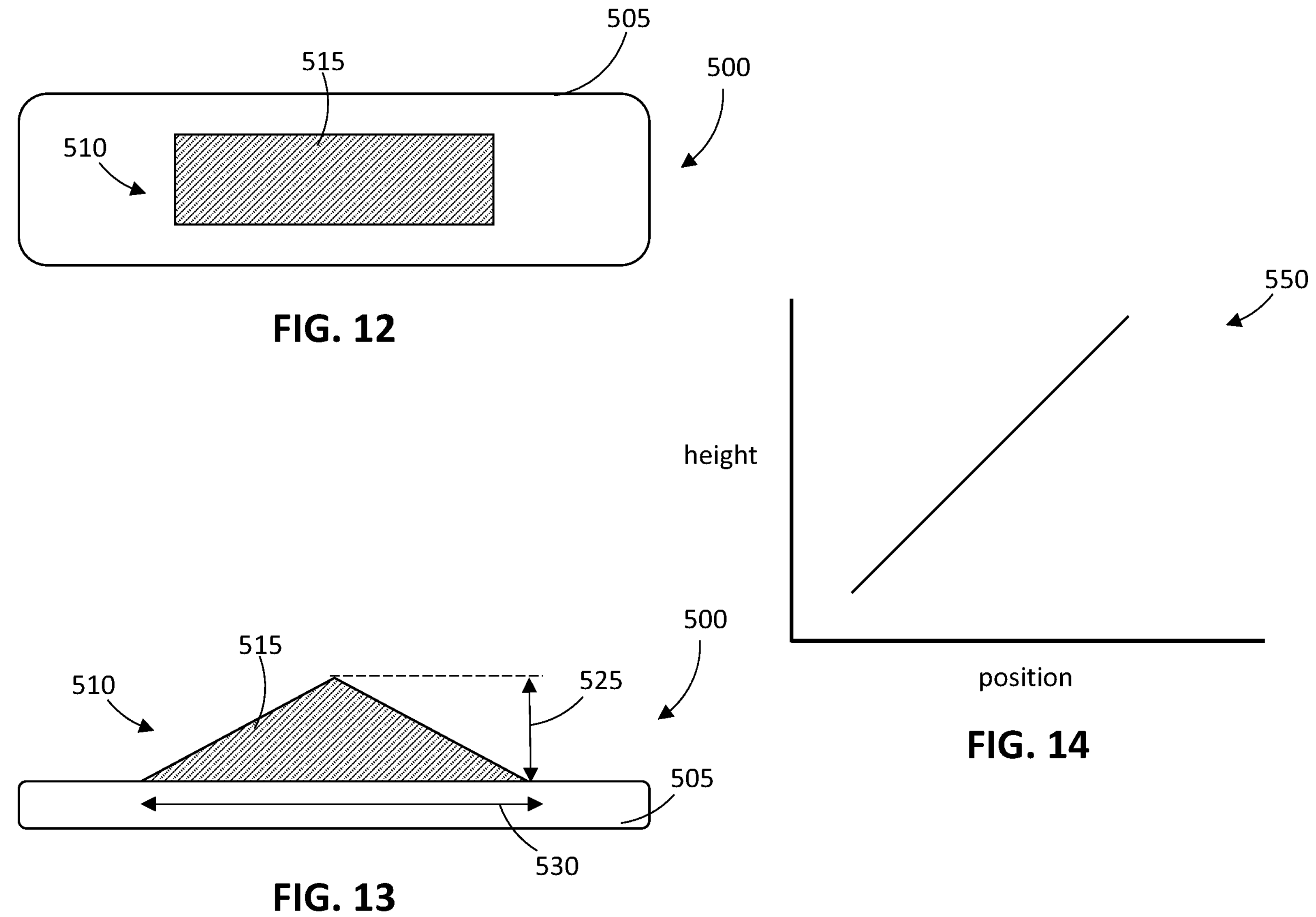
FIG. 12 is a top view of a substrate including another calibration material, in accordance with various embodiments.
FIG. 13 is a side view of the substrate of FIG. 12, in accordance with various embodiments.
FIG. 14 is a curve of height versus position for the calibration material of FIG. 11, in accordance with various embodiments.

In some embodiments, multiple calibration materials may be used to determine one or more calibration curves. FIGS. 12 and 13 show top and side views of a calibration assembly 500, according to at least one embodiment. As shown, the calibration assembly 500 includes a substrate 505 (which may be similar or equivalent to the substrates 305, 405), such as a microscope slide. A calibration material 510 is disposed on the substrate, having a variable upper surface 515. As shown in FIG. 13, the surface 515 has a height that increases at a predetermined rate 525 (e.g., a linear rate, a logarithmic rate, an exponential rate, etc.) along an axis of the calibration material 510 (e.g., across a length, which may also be known) of the material 510. In various embodiments, fiducial markers are disposed (e.g., affixed) to the top surface of the calibration material 510 and optical metrics are determined using similar methods as described above. Accordingly, the image capture system 250 may determine one or more calibration curves 550 to relate the determined optical metrics of the fiducial markers to a height of the calibration material.

Figures 15, 16:
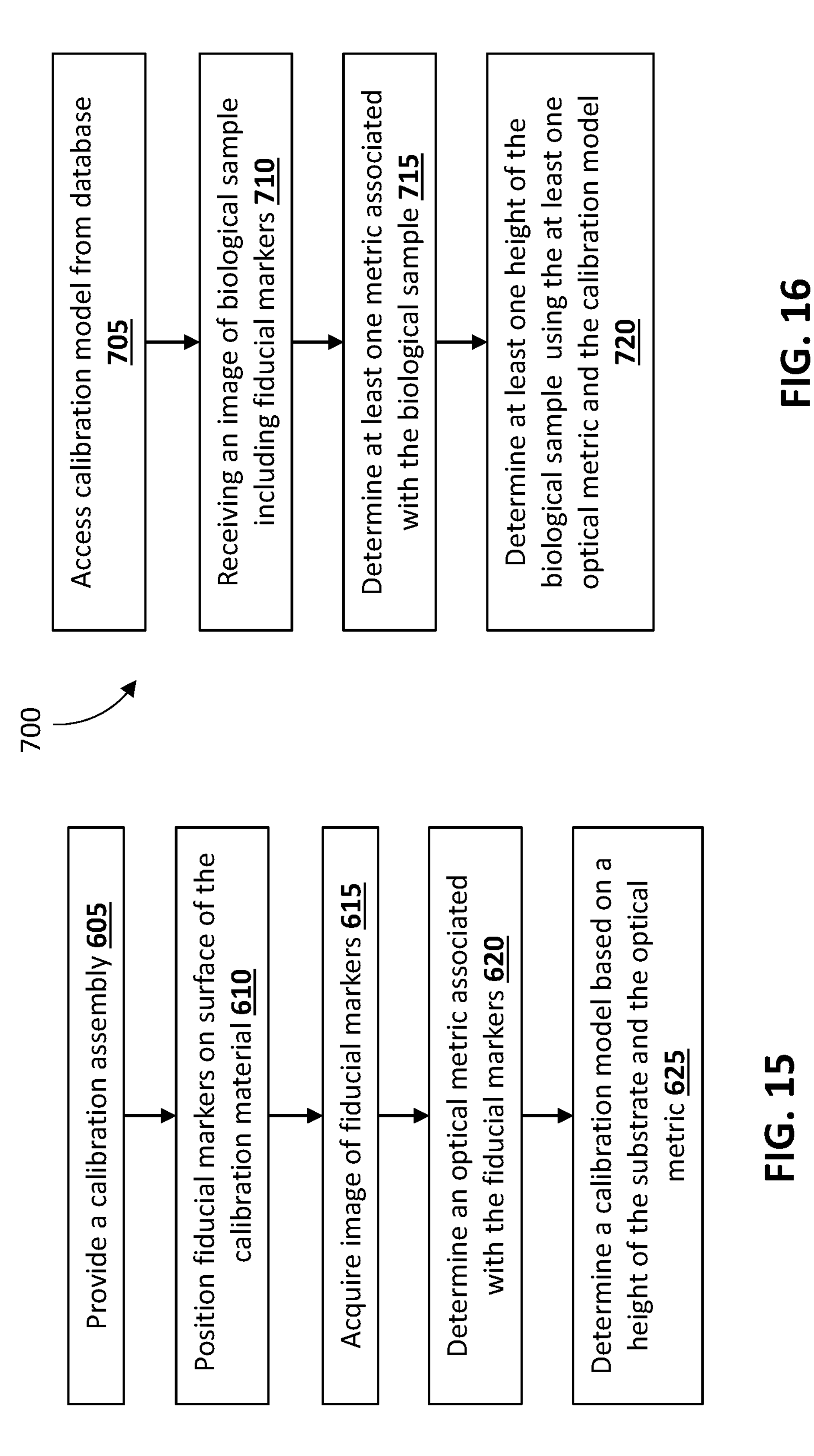
FIG. 15 is a flow diagram of a method of determining a calibration model for a substrate, in accordance with various embodiments.
FIG. 16 is a flow diagram of a method of determining a height profile for a sample, in accordance with various embodiments.

As described above, the tissue measurement system 200 may first be calibrated using one or more calibration materials and then subsequently used to determine one or more physical parameters (e.g., height) of a sample material (e.g., biological tissue). FIG. 15 shows a method 600 of calibrating the tissue measurement system 200. In an operation 605, a calibration assembly (e.g., calibration assembly 310, 510) may be provided or prepared, where the calibration assembly includes a substrate (e.g., microscope slide) and a calibration material disposed on the substrate. The calibration material may include one or more surfaces, each having a predetermined height. Fiducial markers (e.g., fiducial markers 345) may then be positioned on the one or more surfaces of calibration material in an operation 610. In various implementations, positioning of the fiducial markers on the calibration material may be done by a user and/or by an automated process. In an operation 615, one or more images of the calibration material with the fiducial markers may be collected (e.g., by the data collection system 220). The computing system 210 may then determine at least one optical metric (e.g., diameter, intensity, etc.) associated with the fiducial markers in an operation 620 and, in an operation 625, generate at least one calibration model (e.g., calibration curve 355, 450), which relates the at least one optical metric to the predetermined heights of the one or more surfaces of the calibration material. The computing system 210 may then store the at least one calibration model (e.g., in the database 245) for future use.

FIG. 16 shows a method 700 of using the tissue measurement system 200, according to at least one embodiment. After at least one calibration model is determined using the method 600, the computing system 210 may access the at least one calibration model from the database 245 in an operation 705. In an operation 710, the data collection system 220 may receive one or more images corresponding to a sample assembly (e.g., assembly 410), which includes a substrate (e.g., substrate 405) and a sample material (e.g., sample material 405) disposed on the substrate. In an operation 715, computing system 210 may determine at least one optical metric (e.g., intensity, diameter, etc.) from the one or more images of the sample material. In an operation 720, the computing system 210 may then determine at least one height of the sample material using the at least one optical metric determined in the operation 715 and interpolating the height from the calibration model accessed in the operation 705.

Notwithstanding the embodiments described above in reference to FIGS. 1 to 16, various modifications and inclusions to those embodiments are contemplated and considered within the scope of the present disclosure.

Example embodiments of the disclosed approach include, without limitation:

Example A1: A method comprising: receiving an image of a plurality of fiducial markers, wherein the plurality of fiducial markers has at least one predetermined height relative to a substrate; determining at least one optical metric associated with the plurality of fiducial markers within the image; and determining a calibration model based on the at least one predetermined height and the at least one optical metric.

Example A2: The method of A1, wherein the plurality of fiducial markers is positioned on at least one surface of a calibration material, wherein the calibration material is disposed on the substrate.

Example A3: The method of A2, wherein the calibration material is fabricated on the substrate using at least one of photopatterning, micromilling, etching, injection molding, hot embossing, and/or 3D printing.

Example A4: The method of A2, wherein the calibration material is fabricated on the substrate using photopatterning.

Example A5: The method of A2, wherein the calibration material is fabricated on the substrate using micromilling.

Example A6: The method of A2, wherein the calibration material is fabricated on the substrate using etching.

Example A7: The method of A2, wherein the calibration material is fabricated on the substrate using injection molding.

Example A8: The method of A2, wherein the calibration material is fabricated on the substrate using hot embossing.

Example A9: The method of A2, wherein the calibration material is fabricated on the substrate using 3D printing.

Example A10: The method of any one of A2-A9, wherein the substrate comprises one or more height references, wherein each height reference is associated with a unique surface of the at least one surface.

Example A11: The method of any one of A2-A10, wherein the at least one surface comprises a plurality of surfaces.

Example A12: The method of A11, wherein the plurality of surfaces comprises a plurality of steps.

Example A13: The method of any one of A1-A12, wherein the plurality of fiducial markers have a substantially uniform size and shape.

Example A14: The method of any one of A1-A13, wherein the plurality of fiducial markers comprise fluorescent elements.

Example A15: The method of any one of A1-A14, wherein the at least one optical metric comprises a diameter.

Example A16: The method of A15, wherein the diameter is a defocused diameter of at least one of the plurality of fiducial markers.

Example A17: The method of any one of A1-A16, wherein a same focal plane is used to determine the at least one optical metric associated with the plurality of fiducial markers.

Example A18: The method of any one of A1-A17, wherein the at least one optical metric comprises an intensity.

Example A19: The method of any one of A1-A18, wherein the at least one optical metric comprises a focal plane.

Example A20: The method of any one of A1-A19, wherein the at least one optical metric comprises a shape.

Example A21: The method of any one of A1-A20, wherein the at least one predetermined height is less than or equal to about 50 microns.

Example A22: The method of any one of A1-A21, wherein the at least one predetermined height is less than or equal to about 1 micron.

Example A23: The method of any one of A1-A22, wherein the at least one predetermined height is less than or equal to about 0.25 micron.

Example A24: The method of any one of A1-A23, wherein the calibration model is a calibration curve.

Example A25: The method of any one of A1-A24, further comprising storing the calibration model in a database.

Example A26: The method of A25, wherein the database is at a remote server.

Example B1: A computer program product comprising a computer readable storage medium having program instructions stored thereon, the program instructions executable by a processor to cause the processor to perform a method comprising: receiving an image of a plurality of fiducial markers, wherein the plurality of fiducial markers has at least one predetermined height relative to a substrate; determining at least one optical metric associated with the plurality of fiducial markers within the image; and determining a calibration model based on the at least one predetermined height and the at least one optical metric.

Example B2: The computer program product of B1, wherein the plurality of fiducial markers is positioned on at least one surface of a calibration material, wherein the calibration material is disposed on the substrate.

Example B3: The computer program product of B2, wherein the calibration material is fabricated on the substrate using at least one of photopatterning, micromilling, etching, injection molding, hot embossing, or 3D printing.

Example B4: The computer program product of B2, wherein the substrate comprises one or more height references, wherein each height reference is associated with a unique surface of the at least one surface.

Example B5: The computer program product of any one of B2-B4, wherein the at least one surface comprises a plurality of surfaces.

Example B6: The computer program product of B5, wherein the plurality of surfaces comprises a plurality of steps.

Example B7: The computer program product of any one of B1-B6, wherein the plurality of fiducial markers have a substantially uniform size and shape.

Example B8: The computer program product of any one of B1-B7, wherein the plurality of fiducial markers comprise fluorescent elements.

Example B9: The computer program product of any one of B1-B8, wherein the at least one optical metric comprises a diameter.

Example B10: The computer program product of B9, wherein the diameter is a defocused diameter of at least one of the plurality of fiducial markers.

Example B11: The computer program product of any one of B1-B10, wherein a same focal plane is used to determine the at least one optical metric associated with the plurality of fiducial markers.

Example B12: The computer program product of any one of B1-B11, wherein the at least one optical metric comprises an intensity.

Example B13: The computer program product of any one of B1-B12, wherein the at least one optical metric comprises a focal plane.

Example B14: The computer program product of any one of B1-B13, wherein the at least one optical metric comprises a shape.

Example B15: The computer program product of any one of B1-B14, wherein the at least one predetermined height is less than or equal to about 50 microns.

Example B16: The computer program product of any one of B1-B14, wherein the at least one predetermined height is less than or equal to about 1 micron.

Example B17: The computer program product of any one of B1-B14, wherein the at least one predetermined height is less than or equal to about 0.25 micron.

Example B18: The computer program product of any one of B1-B17, wherein the calibration model is a calibration curve.

Example B19: The computer program product of any one of B1-B18, wherein the method further comprises storing the calibration model in a database.

Example B20: The computer program product of B19, wherein the database is at a remote server.

Example C1: A system comprising: a computing node comprising a computer readable storage medium having program instructions stored thereon, the program instructions executable by a processor of the computing node to cause the processor to perform a method comprising: receiving an image of a plurality of fiducial markers, wherein the plurality of fiducial markers has at least one predetermined height relative to a substrate; determining at least one optical metric associated with the plurality of fiducial markers within the image; and determining a calibration model based on the at least one predetermined height and the at least one optical metric.

Example C2: The system of C1, wherein the plurality of fiducial markers is positioned on at least one surface of a calibration material, wherein the calibration material is disposed on the substrate.

Example C3: The system of C2, wherein the calibration material is fabricated on the substrate using at least one of photopatterning, micromilling, etching, injection molding, hot embossing, or 3D printing.

Example C4: The system of C2, wherein the substrate comprises one or more height references, wherein each height reference is associated with a unique surface of the at least one surface.

Example C5: The system of any one of C2-C4, wherein the at least one surface comprises a plurality of surfaces.

Example C6: The system of C5, wherein the plurality of surfaces comprises a plurality of steps.

Example C7: The system of any one of C1-C6, wherein the plurality of fiducial markers have a substantially uniform size and shape.

Example C8: The system of any one of C1-C7, wherein the plurality of fiducial markers comprise fluorescent elements.

Example C9: The system of any one of C1-C8, wherein the at least one optical metric comprises a diameter.

Example C10: The system of C9, wherein the diameter is a defocused diameter of at least one of the plurality of fiducial markers.

Example C11: The system of any one of C1-C10, wherein a same focal plane is used to determine the at least one optical metric associated with the plurality of fiducial markers.

Example C12: The system of any one of C1-C11, wherein the at least one optical metric comprises an intensity.

Example C13: The system of any one of C1-C12, wherein the at least one optical metric comprises a focal plane.

Example C14: The system of any one of C1-C13, wherein the at least one optical metric comprises a shape.

Example C15: The system of any one of C1-C14, wherein the at least one predetermined height is less than or equal to about 50 microns.

Example C16: The system of any one of C1-C14, wherein the at least one predetermined height is less than or equal to about 1 micron.

Example C17: The system of any one of C1-C14, wherein the at least one predetermined height is less than or equal to about 0.25 micron.

Example C18: The system of any one of C1-C17, wherein the calibration model is a calibration curve.

Example C19: The system of any one of C1-C18, wherein the system further comprises a camera, where the image is acquired by the camera.

Example C20: The system of any one of C1-C19, wherein the system further comprises a database, wherein the method further comprises storing the calibration model in the database.

Example C21: The system of C20, wherein the database is at a remote server.

Example D1: A method comprising: accessing a calibration model from a database; receiving an image of a plurality of fiducial markers disposed on a biological sample, wherein the biological sample is positioned on a substrate; and determining, based on the calibration model and the image, one or more measured heights of the biological sample.

Example D2: The method of D1, further comprising calibrating a motion control system based on the one or more measured heights.

Example D3: The method of either D1 or D2, further comprising determining an imageable volume for the biological sample based on the one or more measured heights.

Example D4: The method of D3, further comprising determining a plurality of z-stacks of the imageable volume.

Example D5: The method of any one of D1-D4, wherein the calibration model is determined by the method of any one of A1-A26.

Example E1: A computer program product comprising a computer readable storage medium having program instructions stored thereon, the program instructions executable by at least one processor to cause the processor to perform a method comprising: accessing a calibration model from a database; receiving an image of a plurality of fiducial markers disposed on a biological sample, wherein the biological sample is positioned on a substrate; and determining, based on the calibration model and the image, one or more measured heights of the biological sample.

Example E2: The computer program product of E1, further comprising calibrating a motion control system based on the one or more measured heights.

Example E3: The computer program product of either E1 or E2, further comprising determining an imageable volume for the biological sample based on the one or more measured heights.

Example E4: The computer program product of E3, further comprising determining a plurality of z-stacks of the imageable volume.

Example E5: The computer program product of any one of E1-E4, wherein the calibration model is determined by the method of any one of A1-A26.

Example F1: A system comprising: a computing system comprising at least one computer readable storage medium having program instructions stored thereon, the program instructions executable by at least one processor of the computing system to cause the at least one processor to perform a method comprising: accessing a calibration model from a database; receiving an image of a plurality of fiducial markers disposed on a biological sample, wherein the biological sample is positioned on a substrate; and determining, based on the calibration model and the image, one or more measured heights of the biological sample.

Example F2: The system of F1, further comprising a camera, wherein the image is obtained by the camera.

Example F3: The system of either F1 or F2, the method further comprising calibrating a motion control system based on the one or more measured heights.

Example F4: The system of any one of F1-F3, the method further comprising determining an imageable volume for the biological sample based on the one or more measured heights.

Example F5: The system of any one of F1-F4, the method further comprising determining a plurality of z-stacks of the imageable volume.

Example F6: The system of any one of F1-F5, wherein the database is a local database.

Example F7: The system of any one of F1-F6, wherein the database is a remote database.

Example F8: The system of any one of F1-F7, wherein the calibration model is determined by the method of any one of A1-A26.

Example G1: A method comprising: providing a calibration slide, the calibration slide comprising a substrate having a calibration material disposed thereon, wherein the calibration material comprises at least one surface having a plurality of predetermined heights relative to the substrate; positioning a first plurality of fluorescent markers on the at least one surface; acquiring a first image of the plurality of fluorescent markers; determining, from the first image, at least one optical metric associated with the plurality of fluorescent markers within the first image; and determining a calibration model based on the at least one predetermined height and the at least one optical metric.

Example G2: The method of G1, further comprising: providing a sample slide comprising a biological sample; positioning a second plurality of fluorescent markers on one or more surfaces of the biological sample; acquiring a second image of the second plurality of fluorescent markers; and determining, based on the calibration model and the second image, a plurality of measured heights of the biological sample.

Example G3: The method of G2, further comprising determining an imageable volume for the biological sample based on the one or more measured heights.

Example G4: The method of any one of G1-G3, further comprising determining a plurality of z-stacks of the imageable volume.

Example G5: The method of any one of G1-G4, wherein the calibration model is determined by the method of any one of A1-A26.

Example H1: A calibration slide comprising: a substrate; a calibration material having a plurality of steps comprising a plurality of predetermined heights relative to the substrate, wherein adjacent steps have a step height of about 0.1 micron to about 5 microns.

Example H2: The calibration slide of H1, wherein the width of each step is at least 1 mm.

Example H3: The calibration slide of H2, wherein the width of each step is between 1 mm and 50 mm.

Example H4: The calibration slide of any one of H1-H3, wherein the calibration material is fabricated on the substrate using at least one of photopatterning, micromilling, etching, injection molding, hot embossing, or 3D printing.

Example H5: The calibration slide of any one of H1-H4, wherein the substrate comprises one or more height references, wherein each height reference is associated with a unique step of the plurality of steps.

Example I1: A kit comprising: a calibration slide of any one of H1-H5; and a plurality of fiducial markers.

Example J1: A method comprising: acquiring, using an image sensor, an image corresponding to a slide preparation comprising a slide, a material sample disposed on the slide, and a marker disposed on a surface of the material sample; determining a metric of the marker within the image; and determining, according to the metric, a physical dimension of the material sample at the marker along a defined axis by applying a calibration model to the metric, the calibration model correlating metrics of imaged markers to physical dimensions along the defined axis.

Example J2: The method of J1, wherein the metric varies according to which focal plane the marker is located in.

Example J3: The method of either J1 or J2, wherein the marker comprises a plurality of fluorescent elements.

Example J4: The method of any one of J1-J3, wherein the physical dimension is a height or thickness of the material sample on the slide preparation.

Example J5: The method of J4, wherein the material sample is a tissue sample, and wherein the height or thickness of the tissue sample is no greater than about 50 microns.

Example J6: The method of any one of J1-J5, wherein the calibration model is based on a calibration slide with regions of varying step height along an axis of the slide.

Example J7: The method of any one of J1-J6, further comprising generating the calibration model using the calibration slide with a plurality of reference markers disposed thereon.

Example J8: The method of any one of J1-J7, wherein the calibration model is based on any calibration slide of one of H1-H5 with regions of varying step height along an axis of the slide.

Example J9: The method of any one of J1-J8, further comprising generating the calibration model using the calibration slide with a plurality of reference markers disposed thereon.

Example J10: The method of any one of J1-J9, wherein generating the calibration model comprises generating a calibration curve of the metric as a function of the physical dimension.

Example J11: The method of any one of J1-J10, further comprising manufacturing the calibration slide using at least one of photopatterning, micromilling, etching, injection molding, hot embossing, or 3D printing.

Example J12: The method of any one of J1-J11, wherein the marker is a first marker, the metric is a first metric, the slide preparation further comprises a second marker disposed on the slide, and the physical dimension of the material sample is determined based on a difference between the first metric and the second metric.

Example J13: The method of any one of J1-J12, wherein the slide preparation comprises a plurality of markers on the slide, a plurality of metrics is determined based on the plurality of markers, and the method further comprises determining that the slide is level based on the plurality of metrics.

Example J14: The method of any one of J1-J13, wherein the plurality of markers comprises a first pair of markers on a first side of the material sample and a second pair of markers on a second side of the material sample.

Example K1: A method comprising: acquiring, using a light sensor, light from a slide preparation comprising a slide, a material sample disposed on the slide, and a marker disposed on a surface of the material sample; determining an intensity of light from the marker; and determining, according to the intensity, a physical dimension of the material sample at the marker along a defined axis by applying a calibration model to the intensity, the calibration model correlating light intensity of markers to physical dimensions along the defined axis.

Example K2: The method of K1, wherein the marker comprises a plurality of fluorescent beads, the material sample is a tissue sample that is no greater than about 50 microns, and the physical dimension is a height of the tissue sample.

Example K3: The method of either K1 or K2, wherein the calibration model is based on a calibration slide, and wherein the method further comprises using the calibration slide to generate a calibration curve of the metric as a function of the physical dimension.

Example K4: The method of any one of K1-K3, wherein the calibration slide comprises regions of varying step height along an axis of the slide.

Example L1: A system comprising: a sensor configured to capture an image of a slide preparation or detect light from the slide preparation, the slide preparation comprising a slide, a material sample disposed on the slide, and a marker disposed on a surface of the material sample; and at least one processor configured to: acquire, using the sensor, (i) an image of the marker, or (ii) light from the marker; determine, according to the acquired image or the intensity of light, a metric of the marker; and determine, according to the metric, a physical dimension of the material sample at the marker along a defined axis by applying a calibration model to the metric, the calibration model correlating metrics of markers to physical dimensions along the defined axis.

Example L2: The system of L1, wherein the metric is based on a size or a shape of the marker.

Example L3: The system of either L1 or L2, wherein the metric is based on intensity of fluorescent light from the marker.

Example L4: The system of any one of L1-L3, wherein the system further comprises a light source configured to excite fluorescent elements.

Example L5: The system of any one of L1-L4, wherein the at least one processor is further configured to generate a calibration curve of the metric as a function of the physical dimension based on a calibration slide with regions of varying height.

Example M1: A method comprising: using a calibration slide with reference markers disposed thereon to generate a calibration curve based on optical measurements of the calibration slide, the calibration slide comprising regions of varying height in the z-axis, wherein the calibration curve correlates an optical metric to a z-axis position of the reference markers disposed on the regions of the calibration slide; acquiring, using a sensor, at least one of (i) fluorescent light from a plurality of fluorescent elements disposed on a sectional tissue sample which is disposed on a substantially flat slide, or (ii) an image of the sectional tissue sample with the plurality of fluorescent elements disposed thereon; generating, according to the at least one of the fluorescent light or the image, the optical metric corresponding to the fluorescent elements disposed on the sectional tissue sample; and applying the calibration model to the optical metric to determine a height of the sectional tissue sample.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be understood that elements of the various embodiments may be incorporated or utilized with any of the other embodiments disclosed herein.

What is claimed is:

1. A method comprising:

receiving, by one or more processors, an image of a plurality of fiducial markers on a substrate, wherein the image is acquired using an image sensor, and wherein the plurality of fiducial markers has at least one predetermined height relative to the substrate;

processing, by the one or more processors, the image to obtain at least one optical metric associated with the plurality of fiducial markers within the image, the at least one optical metric comprising a defocused diameter of at least one of the plurality of fiducial markers when imaging at a reference focal plane;

generating, by the one or more processors, a calibration model based on the at least one predetermined height and the at least one optical metric, the calibration model configured to provide a calibrated height or thickness of a biological sample when the calibration model is applied to one or more optical metrics obtained from an image of the biological sample with fiducial markers disposed thereon; and storing, by the one or more processors, the calibration model in a non-transitory computer-readable medium.

2. The method of claim 1, wherein the plurality of fiducial markers is positioned on at least one surface of a calibration material, wherein the calibration material is disposed on the substrate.

3. The method of claim 2, wherein the substrate comprises one or more height references, wherein each height reference is associated with a unique surface of the at least one surface.

4. The method of claim 2, wherein the at least one surface comprises a plurality of surfaces.

5. The method of claim 4, wherein the plurality of surfaces comprises a plurality of steps.

6. The method of claim 1, wherein the at least one optical metric comprises a diameter.

7. The method of claim 6, wherein the diameter is a defocused diameter of at least one of the plurality of fiducial markers.

8. The method of claim 1, wherein a same focal plane is used to determine the at least one optical metric associated with the plurality of fiducial markers.

9. The method of claim 1, wherein the at least one predetermined height is less than or equal to about 50 microns.

10. The method of claim 1, wherein the calibration model is a calibration curve.

11. The method of claim 1, wherein the calibration model is stored in a database located at a remote server.

12. The method of claim 1, wherein the calibration model is configured to compensate for variations between dried and hydrated states of biological samples.

13. A method performed by one or more processors, the method comprising:

accessing a calibration model from a database, the calibration model configured to provide a calibrated height or thickness when applied to an optical metric associated with a fiducial marker;

receiving an image of a plurality of fiducial markers disposed on a biological sample, wherein the biological sample is positioned on a substrate, and wherein the image is acquired at a reference focal plane using an image sensor;

processing the image to obtain at least one optical metric associated with the plurality of fiducial markers, the at least one optical metric comprising a defocused diameter of at least one of the plurality of fiducial markers when imaging the reference focal plane; and applying the calibration model to the at least one optical metric to obtain one or more measured heights or thicknesses of the biological sample.

14. The method of claim 13, further comprising calibrating a motion control system based on the one or more measured heights or thicknesses.

15. The method of claim 13, further comprising determining an imageable volume for the biological sample based on the one or more measured heights or thicknesses.

16. The method of claim 15, further comprising determining a plurality of z-stacks of the imageable volume.

17. A method comprising:

providing a calibration slide, the calibration slide comprising a substrate having a calibration material disposed thereon, wherein the calibration material comprises at least one surface having a plurality of predetermined heights relative to the substrate;

positioning a first plurality of fluorescent markers on the at least one surface;

acquiring a first image of the plurality of fluorescent markers;

determining, from the first image, at least one optical metric associated with the plurality of fluorescent markers within the first image; and determining a calibration model based on the at least one predetermined height and the at least one optical metric.

18. The method of claim 17, further comprising:

providing a sample slide comprising a biological sample;

positioning a second plurality of fluorescent markers on one or more surfaces of the biological sample;

acquiring a second image of the second plurality of fluorescent markers; and determining, based on the calibration model and the second image, a plurality of measured heights of the biological sample.

19. The method of claim 18, further comprising determining an imageable volume for the biological sample based on the one or more measured heights.

20. The method of claim 17, the method further comprising determining a plurality of z-stacks of the imageable volume.

* * * * *